United States Patent
Krimstock et al.

(10) Patent No.: US 7,822,587 B1
(45) Date of Patent: Oct. 26, 2010

(54) HYBRID DATABASE ARCHITECTURE FOR BOTH MAINTAINING AND RELAXING TYPE 2 DATA ENTITY BEHAVIOR

(75) Inventors: Roger I. Krimstock, Boulder, CO (US); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 921 days.

(21) Appl. No.: 11/242,687

(22) Filed: Oct. 3, 2005

(51) Int. Cl.
G06G 7/48 (2006.01)
H04M 3/00 (2006.01)
G06F 9/46 (2006.01)
G06F 11/34 (2006.01)
G06F 9/44 (2006.01)

(52) U.S. Cl. .................. 703/6; 379/265.06; 705/9; 705/11; 717/134; 717/135

(58) Field of Classification Search ........... 379/265.01–265.06; 717/134–135; 707/2, 9; 703/6; 705/9, 11
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A * | 11/1992 | Mitchell et al. .......... 379/88.01 |

(Continued)

FOREIGN PATENT DOCUMENTS

CA 2143198 1/1995

(Continued)

OTHER PUBLICATIONS

US 6,537,685, 3/2003, Fisher et al. (withdrawn).

(Continued)

*Primary Examiner*—Kamini S Shah
*Assistant Examiner*—Akash Saxena
(74) *Attorney, Agent, or Firm*—Sheridan Ross P.C.

(57) ABSTRACT

A database schema architecture and operators therefor is disclosed for storing data providing information about membership of items in one or more groups, wherein when such a group is a simulated group, access to group item data related to activities of the group items prior to creation of the simulated group is provided. When such a group is an actual group, access to group item data related to activities of the group items prior to creation of the group is constrained such that group entities have database Type 2 behavior. The architecture provides a common schema for both actual and simulated groups. The architecture provides the ability to create simulated or hypothesized groups of agents in a contact center, wherein the groups can be evaluated using agents' past performance. Such groups are represented by the same schemas as actual groups, and the data entities for the actual groups exhibit Type 2 database behavior.

14 Claims, 16 Drawing Sheets

U.S. PATENT DOCUMENTS

| | | |
|---|---|---|
| 5,164,983 A | 11/1992 | Brown et al. |
| 5,167,010 A | 11/1992 | Elm et al. |
| 5,185,780 A * | 2/1993 | Leggett ................. 379/265.08 |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A * | 5/1994 | Loftin et al. ................... 703/6 |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A * | 1/1997 | Honda et al. ........... 379/266.05 |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A * | 11/1997 | Powers et al. .................. 705/11 |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A * | 7/1998 | Carney ................. 379/265.06 |
| 5,790,642 A | 8/1998 | Taylor et al. |
| 5,790,650 A * | 8/1998 | Dunn et al. ........... 379/265.03 |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A * | 11/1998 | Hambrick et al. ............... 705/8 |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A * | 6/1999 | Havens ........................ 705/11 |
| 5,911,134 A * | 6/1999 | Castonguay et al. ............ 705/9 |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A * | 7/2000 | Flockhart et al. ....... 379/265.12 |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |

| Patent No. | Date | Name |
|---|---|---|
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 * | 4/2003 | D'Alessandro ............... 705/10 |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 * | 8/2003 | Judkins et al. ......... 379/265.06 |
| 6,604,084 B1 * | 8/2003 | Powers et al. ................. 705/11 |
| 6,614,903 B1 | 9/2003 | Flockhart et al. |
| 6,650,748 B1 | 11/2003 | Edwards et al. |
| 6,668,167 B2 | 12/2003 | McDowell et al. |
| 6,675,168 B2 | 1/2004 | Shapiro et al. |
| 6,684,192 B2 * | 1/2004 | Honarvar et al. ............... 703/6 |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 * | 3/2004 | Prabhaker ............. 379/265.01 |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 * | 11/2005 | Hanaman et al. ................ 703/6 |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,062,031 B2 * | 6/2006 | Becerra et al. ......... 379/265.01 |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 * | 1/2007 | McConnell et al. .... 379/265.02 |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 * | 8/2007 | Lilly ............................. 703/6 |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,376,127 B2 | 5/2008 | Hepworth et al. |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 * | 3/2009 | Whitman, Jr. .................. 703/6 |
| 7,500,241 B1 | 3/2009 | Flockhart et al. |
| 7,526,440 B2 | 4/2009 | Walker et al. |
| 7,545,925 B2 | 6/2009 | Williams |
| 7,567,653 B1 | 7/2009 | Michaelis |
| 2001/0011228 A1 | 8/2001 | Shenkman |
| 2001/0034628 A1 * | 10/2001 | Eder ............................. 703/6 |
| 2001/0056367 A1 * | 12/2001 | Herbert et al. ................. 705/11 |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |

| | | | |
|---|---|---|---|
| 2002/0123923 A1 | 9/2002 | Manganaris et al. | |
| 2003/0028621 A1 | 2/2003 | Furlong et al. | |
| 2003/0073440 A1 | 4/2003 | Mukherjee et al. | |
| 2003/0086554 A1* | 5/2003 | Krimstock et al. | 379/265.02 |
| 2003/0093465 A1 | 5/2003 | Banerjee et al. | |
| 2003/0108186 A1 | 6/2003 | Brown et al. | |
| 2003/0144900 A1 | 7/2003 | Whitmer | |
| 2003/0144959 A1 | 7/2003 | Makita | |
| 2003/0231757 A1 | 12/2003 | Harkreader et al. | |
| 2004/0008828 A1 | 1/2004 | Coles et al. | |
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0102940 A1* | 5/2004 | Lendermann et al. | 703/6 |
| 2004/0103324 A1 | 5/2004 | Band | |
| 2004/0138944 A1* | 7/2004 | Whitacre et al. | 705/11 |
| 2004/0162998 A1 | 8/2004 | Tuomi et al. | |
| 2004/0202308 A1 | 10/2004 | Baggenstoss et al. | |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0240659 A1 | 12/2004 | Gagle et al. | |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0043986 A1* | 2/2005 | McConnell et al. | 705/11 |
| 2005/0044375 A1 | 2/2005 | Paatero et al. | |
| 2005/0065837 A1 | 3/2005 | Kosiba et al. | |
| 2005/0071211 A1 | 3/2005 | Flockhart et al. | |
| 2005/0071212 A1 | 3/2005 | Flockhart et al. | |
| 2005/0071241 A1 | 3/2005 | Flockhart et al. | |
| 2005/0071844 A1 | 3/2005 | Flockhart et al. | |
| 2005/0091071 A1* | 4/2005 | Lee | 705/1 |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0015388 A1 | 1/2006 | Flockhart et al. | |
| 2006/0026049 A1 | 2/2006 | Joseph et al. | |
| 2006/0056598 A1 | 3/2006 | Brandt et al. | |
| 2006/0135058 A1 | 6/2006 | Karabinis | |
| 2006/0167667 A1* | 7/2006 | Maturana et al. | 703/6 |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth, et al. | |
| 2006/0285648 A1* | 12/2006 | Wahl et al. | 379/1.01 |
| 2007/0038632 A1* | 2/2007 | Engstrom | 707/9 |
| 2007/0064912 A1 | 3/2007 | Kagan et al. | |
| 2007/0083572 A1 | 4/2007 | Bland et al. | |
| 2007/0112953 A1* | 5/2007 | Barnett | 709/224 |
| 2007/0127643 A1 | 6/2007 | Keagy | |
| 2007/0156375 A1* | 7/2007 | Meier et al. | 703/6 |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1 | 3/2008 | Petrovykh | |
| 2009/0193050 A1 | 7/2009 | Olson | |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| GB | 2273418 | 6/1994 |
| GB | 2290192 | 12/1995 |
| JP | 2001-053843 | 2/2001 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 02/099640 | 12/2002 |

OTHER PUBLICATIONS

U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
"Applications, NPRI's Predictive Dialing Package," Computer Technology (Fall 1993), p. 86.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.
Atkins et al; "Common Presence and Instant Messaging: Message Format," Network Working, Group (Jan. 9, 2003), available at http://www.ietf.org/internet-drafts/draft-ietf-impp-cpim-msgfmt-08.txt, 31 pages.
Avaya, Inc. Business Advocate Product Summary, at http://www.avaya.com, downloaded on Feb. 15, 2003, Avaya, Inc. 2003, 3 pages.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Bill Michael, "The Politics of Naming" www.cConvergence.com (Jul. 2001) pp. 31-35.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality In IP Voice Networks," Avaya, Inc., 2002, pp. 1-17.

ComputerWorld, ETL, M. Songini, at http://www.computerworld.com/databasetopics/businessintelligence/datawarehouse/story/....., copyright 2005, 5 pages.

Creating and Using Data Warehouse-Using Dimensional Modeling (Microsoft) downloaded May 18, 2005 http://msdn.microsoft.com/library/en-us/createdw/createdw_39z.asp?frame=true 1 page.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

CS 345: Topics in Data Warehousing, Oct. 5, 2004, 36 pages.

Data Warehouse Designer—Design Constraints and Unavoidable Realities, No design Problem in School was This Hard, Ralph Kimball, Sep. 3, 2002, 3 pages.

Data Warehouse Designer—An Engineer's View—Its' Worthwhile to Remind Ourselves Why We Build Data Warehouses the Way We Do, Ralph Kimball, Jul. 26, 2002, 3 pages.

Data Warehouse Designer—Divide and Conquer, Build Your Data Warehouse One Piece at a Time, Ralph Kimball, Oct. 30, 2002, 3 pages.

Data Warehouse Designer—TCO Starts with the End User, Ralph Kimball, May 13, 2003, http://www.intelligententerprise.com/030513/608warehouse1_1.jhtml?_requestid=598425, 3 pages.

Data Warehouse Designer—The Soul of the Data Warehouse, Part One: Drilling Down, Ralph Kimball, Mar. 20, 2003, 3 pages.

Data Warehouse Designer—The Soul of the Data Warehouse, Part Two: Drilling Across, Ralph Kimball, Apr. 5, 2003, 3 pages.

Data Warehouse Designer—The Soul of the Data Warehouse, Part Three: Handling Time, Ralph Kimball, Apr. 22, 2003, 3 pages.

Data Warehouse Designer—Two Powerful Ideas, The Foundation for Modern Data Warehousing, Ralph Kimball, Sep. 17, 2002, 3 pages.

Data Warehouse Designer Fact Tables and Dimension, Jan. 1, 2003, http://www.inteeigententerprise.com/030101/602warehouse1_1.jhtml, Ralph Kimball, 3 pages.

Dawson, "NPRI's Powerguide, Software Overview" Call Center Magazine (Jun. 1993), p. 85.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Definity Communications System Generic 3 Call Vectoring/Expert Agent Selection (EAS) Guide, AT&T publication No. 555-230-520 (Issue 3, Nov. 1993).

DMReview—Business Dimensional Modeling: The Logical Next Step: Translating the BDM, Laura Reeves, published May 2004, 4 pages.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, 1999, 8 pages.

E. Veerman, "Designing a Dimensional Model", date unknown, 38 pages.

Foster, Robin, et al., "Avaya Business Advocate and its Relationship to Multi-Site Load Balancing Applications," Avaya, Inc., Mar. 2002, 14 pages.

Fundamentals of Data Warehousing—Unit 3—Dimensional Modeling, Fundamentals of Data Warehousing, copyright 2005—Evolve Computer Solutions, 55 pages.

G. Hellstrom et al., "RFC 2793—RTP Payload for Text Consersation," Network Working Group Request for Comments 2793 (May 2000), available at http://www.faqs.org/rfcs/rfc2793.html, 8 pages.

G. Wiederhold, "Mediation to Deal with Heterogeneous Data Sources", Stanford University, Jan. 1999, 19 pages.

Glossary—Curlingstone Publishing, http://www.curlingstone.com/7002/7002glossary.html, downloaded May 24, 2005, 11 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

J.E. Bentley, "Metadata: Everyone Talks About It, But What Is It?", First Union National Bank, date unknown, 5 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Kimball, et al., "Practical Techniques for Extracting, Cleaning, Conforming, and Delivering Data." The Data Warehouse ETL Toolkit. 2004. Ch. 5, pp. 170-174.

Kimball, et al., "The Complete Guide to Dimensional Modeling." The Data Warehouse Toolkit. 2nd Edition, 2002. Ch. 11, pp. 240-241.

L. Cabibbo et al., "An Architecture for Data Warehousing Supporting Data Independence and Interoperability", International Journal of Cooperative Information Systems, Nov. 2004, 41 pages.

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Multi-Dimensional Modeling with BW ASAP for BW Accelerator Business Information Warehouse, copyright 2000, 71 pages.

Presentation by Victor Zue, The MIT Oxygen Project, MIT Laboratory for Computer Science (Apr. 25-26, 2000) 9 pages.

Richard Shockey, "ENUM: Phone Numbers Meet the Net" www.cConvergence.com (Jul. 2001) pp. 21-30.

Rose et al..; "The APEX Presence Service," Network Working Group (Jan. 14, 2002), available at http://www.ietf.org/internet-drafts/draft-ietf-apex-presence-06.txt, 31 pages.

Snape, James, "Time Dimension and Time Zones." 2004. pp. 1-10. http://www.jamessnape.me.uk/blog/CommentView,gui,79e910a1-0150-4452-bda3-e98df.

Stevenson et al.; "Name Resolution in Network and Systems Management Environments"; http://netman.cit.buffalo.edu/Doc/DStevenson/NR-NMSE.html; printed Mar. 31, 2003; 16 pages.

Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

The Importance of Data Modeling as a Foundation for Business Insight, Larissa Moss and Steve Hoberman, copyright 2004, 38 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

Aspect—"Analysis and Reporting," http://aspect.com/products/analysis/index.cfm, (Copyright 2005) (1page).

Aspect—"Call Center Reports," http://aspect.com/products/analysis/ccreporting.cfm, (Copyright 2005) (2 pages).

Aspect—"Performance Optimization," http://aspect.com/products/wfm/performanceopt.cfm?section=performanceopt, (Copyright 2005) (1page).

Avaya—"Avaya and Blue Pumpkin—Providing Workforce Optimization Solutions" (Copyright 2004) (3 pages).

Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Cherry, "Anger Management," IEEE Spectrum (Apr. 2005) (1 page).
GEOTEL Communications Corporation Web site printout entitled "Intelligent CallRouter" Optimizing the Interaction Between Customers and Answering Resources., 1998, 6 pages.
NICE Systems—"Insight from Interactions," "Overwhelmed by the Amount of Data at your Contact Center?" http://www.nice.com/products/multimedia/analyzer.php, (Printed May 19, 2005) (2 pages).
NICE Systems—"Multimedia Interaction Products," "Insight from Interactions," http://www.nice.com/products/multimedia/contact_centers.php (Printed May 19, 2005) (3 pages).
Nortel—"Centrex Internet Enabled Call Centers," http://www.products.nortel.com/go/product_assoc.jsp?segld=0&parID=0&catID=-9191&rend_id... (Copyright 1999-2005) (1page).
Microsoft Office Animated Help Tool, date unknown, 1 page.
"Still Leaving It To Fate?: Optimizing Workforce Management", Durr, William Jr., Nov. 2001.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.
Data Warehouse—Surrogate Keys, Keep Control Over Record Identifiers by Generating New Keys for the Data Warehouse, Ralph Kimball, May 1998, 4 pages.
Andy Zmolek; "Simple and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Dillion, "Renaming fields and tracing dependencies", available at http://allenbrowne.com/ser-41.html, Nov. 2003, updated May 2006, 1 page.
Thayer Watkins, "Cost Benefit Analysis", 1999, San Jose State University Economics Department, Web Archive http://web.arch ive.org/web/19990225143131 /http://www.sjsu.edu/faculty/watkins/cba.htm.
Background section of the above-captioned application (previously provided).
Bischoff et al. "Data Ware House Building Method—practical advices telled by persons having experience and experts", Kyouritsu Shuppan Corp. May 30, 2000, first edition, pp. 197-216.
Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Koutarou, "Building a Framework for EC using Hibernate, OSWorkflow", JAVA Press, Japan, Gujutsu Hyouron Company, vol. 25, 2004, pp. 132-147.
Microsoft R Access 97 for Windows R Application development guide, Ver. 8.0, Microsoft Corp., a first version, pp. 569-599.

* cited by examiner

| GROUP 3 DATA ENTITY 28-4 AT TIME T₃ | |
|---|---|
| GROUP SURROGATE KEY | G3SK2 |
| GROUP NATURAL KEY | GK(3) |
| START DATE | 070905 |
| END DATE | |
| TRIAL GROUP (Y/N) | N |
| GROUP DATA | G3GD1 |

Fig. 3C

| MEMBERSHIP ENTITY AT TIME T₃ | | | | |
|---|---|---|---|---|
| MEMBER-SHIP KEY | AGENT KEY | GROUP KEY | START DATE | END DATE |
| M1 | AK(A) | GK(2) | 011504 | |
| M2 | AK(B) | GK(1) | 030104 | |
| M3 | AK(C) | GK(2) | 120204 | 022805 |
| M4 | AK(D) | GK(1) | 010105 | |
| M5 | AK(D) | GK(2) | 020205 | 050205 |
| M6 | AK(A) | GK(3) | 070905 | |
| M7 | AK(B) | GK(3) | 070905 | |
| M8 | AK(C) | GK(4) | 010100 | |
| M9 | AK(C) | GK(4) | 010100 | |
| | | | | |
| | | | | |

Fig. 3D

| MEMBERSHIP ENTITY AT TIME T₄ | | | | |
|---|---|---|---|---|
| MEMBER-SHIP KEY | AGENT KEY | GROUP KEY | START DATE | END DATE |
| M1 | AK(A) | GK(2) | 011504 | |
| M2 | AK(B) | GK(1) | 030104 | |
| M3 | AK(C) | GK(2) | 120204 | 022805 |
| M4 | AK(D) | GK(1) | 010105 | |
| M5 | AK(D) | GK(2) | 020205 | 050205 |
| M6 | AK(A) | GK(3) | 070905 | |
| M7 | AK(B) | GK(3) | 070905 | 071005 |
| M8 | AK(C) | GK(4) | 010100 | |
| M9 | AK(C) | GK(4) | 010100 | 071005 |
| | | | | |
| | | | | |

Fig. 4A

MEMBERSHIP ENTITY AT TIME T₁ (150)

| MEMBER-SHIP KEY | AGENT KEY | GROUP KEY |
|---|---|---|
| M1 | ASK1 | GK(2) |
| M2 | BSK1 | GK(1) |
| M3 | CSK1 | GK(2) |
| M4 | DSK1 | GK(1) |
| M5 | DSK2 | GK(2) |
| M6 | DSK2 | GK(1) |
| M7 | DSK3 | GK(1) |

AGENT D DATA ENTITY 20-4

| AGENT_SURROGATE_KEY | DSK1 |
|---|---|
| AGENT_NATURAL_KEY | AK(D) |
| START_DATE | 010105 |
| END_DATE | 020205 |

AGENT D DATA ENTITY 20-5

| AGENT_SURROGATE_KEY | DSK2 |
|---|---|
| AGENT_NATURAL_KEY | AK(D) |
| START_DATE | 020205 |
| END_DATE | 050205 |

AGENT D DATA ENTITY 20-6

| AGENT_SURROGATE_KEY | DSK3 |
|---|---|
| AGENT_NATURAL_KEY | AK(D) |
| START_DATE | 050205 |
| END_DATE | |

AGENT C DATA ENTITY 20-7

| AGENT_SURROGATE_KEY | CSK2 |
|---|---|
| AGENT_NATURAL_KEY | AK(C) |
| START_DATE | 022805 |
| END_DATE | |

AGENT C DATA ENTITY 20-3

| AGENT_SURROGATE_KEY | CSK1 |
|---|---|
| AGENT_NATURAL_KEY | AK(C) |
| START_DATE | 120204 |
| END_DATE | 022805 |

Fig. 4B

| AGENT A DATA ENTITY 20-1 | |
|---|---|
| AGENT_SURROGATE_KEY | ASK1 |
| AGENT_NATURAL_KEY | AK(A) |
| START_DATE | 011504 |
| END_DATE | 070105 |

| AGENT B DATA ENTITY 20-2 | |
|---|---|
| AGENT_SURROGATE_KEY | BSK1 |
| AGENT_NATURAL_KEY | AK(B) |
| START_DATE | 030104 |
| END_DATE | 070105 |

| AGENT D DATA ENTITY 20-6 | |
|---|---|
| AGENT_SURROGATE_KEY | DSK3 |
| AGENT_NATURAL_KEY | AK(D) |
| START_DATE | 050205 |
| END_DATE | 070105 |

| AGENT C DATA ENTITY 20-7 | |
|---|---|
| AGENT_SURROGATE_KEY | CSK2 |
| AGENT_NATURAL_KEY | AK(C) |
| START_DATE | 022805 |
| END_DATE | 070105 |

| AGENT A DATA ENTITY 20-8 | |
|---|---|
| AGENT_SURROGATE_KEY | ASK2 |
| AGENT_NATURAL_KEY | AK(A) |
| START_DATE | 070105 |
| END_DATE | |

| AGENT B DATA ENTITY 20-9 | |
|---|---|
| AGENT_SURROGATE_KEY | BSK2 |
| AGENT_NATURAL_KEY | AK(B) |
| START_DATE | 070105 |
| END_DATE | |

| AGENT C DATA ENTITY 20-10 | |
|---|---|
| AGENT_SURROGATE_KEY | CSK3 |
| AGENT_NATURAL_KEY | AK(C) |
| START_DATE | 070105 |
| END_DATE | |

| AGENT D DATA ENTITY 20-11 | |
|---|---|
| AGENT_SURROGATE_KEY | DSK4 |
| AGENT_NATURAL_KEY | AK(D) |
| START_DATE | 070105 |
| END_DATE | |

| MEMBERSHIP ENTITY AT TIME $T_2$ | | |
|---|---|---|
| MEMBER-SHIP MEMBER_KEY | AGENT KEY | GROUP KEY |
| M1 | ASK1 | GK(2) |
| M2 | BSK1 | GK(1) |
| M3 | CSK1 | GK(2) |
| M4 | DSK1 | GK(1) |
| M5 | DSK2 | GK(2) |
| M6 | DSK2 | GK(1) |
| M7 | DSK3 | GK(1) |
| M8 | ASK2 | GK(3) |
| M9 | BSK2 | GK(3) |
| M10 | ASK2 | GK(2) |
| M11 | BSK2 | GK(1) |
| M12 | CSK3 | GK(4) |
| M13 | DSK4 | GK(4) |
| M14 | DSK4 | GK(1) |

150

| MEMBERSHIP ENTITY AT TIME $T_4$ | | |
|---|---|---|
| MEMBER-SHIP KEY | AGENT KEY | GROUP KEY |
| M1 | ASK1 | GK(2) |
| M2 | BSK1 | GK(1) |
| M3 | CSK1 | GK(2) |
| M4 | DSK1 | GK(1) |
| M5 | DSK2 | GK(2) |
| M6 | DSK2 | GK(1) |
| M7 | ASK2 | GK(3) |
| M8 | BSK2 | GK(3) |
| M9 | ASK2 | GK(2) |
| M10 | BSK2 | GK(1) |
| M11 | CSK3 | GK(4) |
| M12 | DSK4 | GK(4) |
| M13 | DSK4 | GK(1) |
| M14 | DSK5 | GK(1) |

HYBRID DATABASE ARCHITECTURE FOR BOTH MAINTAINING AND RELAXING TYPE 2 DATA ENTITY BEHAVIOR

RELATED FIELD OF THE INVENTION

The present invention relates to database architecture for retaining information about the grouping of items (e.g., contact center agents) so that from a data entity for a simulated group, access to historical information about activities related to items of the group prior to group creation are readily accessible, and from a data entity for an actual group, access to such historical information is restricted.

BACKGROUND

Various constraint types have been defined for database entities. In particular, data entities may be identified as either Type 1 or Type 2, wherein Type 1 data entities model items or objects in a way that precludes access constraints to information indicative of any changes to the modeled items or objects over time, and wherein Type 2 data entities model items or objects in a way that permits such access constraints to be enforced. For example, for agents of a contact center wherein each agent may be assigned to multiple agent groups concurrently, and may be assigned to or removed from various agent groups over time, data entities for modeling membership of agents in groups is typically modeled as Type 2 so that time-based constraints related to group membership are maintained. In particular, for each database group data entity that models a contact center group, such a typical time-based constraint would be: for each contact center group G, associate the entities in a contact center database so that from a group data entity modeling the group G, the only agent performance data available for access is the agent performance data for each time period that each agent was/is a member of the group G.

Although such Type 2 database schema constraints are generally appropriate and desired, there are circumstances when such constraints preclude easy implementation of certain operations such as simulations of groups. For example, to simulate the performance of a proposed agent group, access would be typically required to at least some (if not most) agent performance data for agents proposed to be members of the simulated group. However, such Type 2 database constraints as described above, prevents access to such historical agent performance data if the simulated group is modeled by a group data entity (and an associated membership data entity) which conforms to such Type 2 constraints. Accordingly, the alternative would be to implement an entire new schema for simulated groups. However, then such simulated groups could not be easily converted to actual groups without re-entering the group information. Moreover, extra effort would be required if it is desired to associate the simulated group information with the actual group so that, e.g., subsequent actual group performance can be compared to the simulated group performance.

Accordingly, it is desirable to have a method and database schema architecture that allows simulated groups as described hereinabove to be implemented with a database schema architecture together with operations that allow both Type 2 constraints for actual groups, and additionally allow simulated groups to be provided, wherein for members of a simulated group, substantially all agent performance data prior to the creation of the simulated group is available to be accessed via a data entity for the simulated group.

TERMS AND DEFINITIONS

Data entity: A collection of data that is logically associated together. In a relational database a data entity can be a row of a table or an entire table.

Database entity type: A schema or definition for organizing data in a database. Such schemas may be specified in SQL or another database related language.

Natural key: An identifier that uniquely identifies a data entity (e.g., a table row) representing a corresponding real world object or action, and through which access is provided to all data identified with the object or action.

Agent surrogate key: A database identifier that is used to associate two data entities (e.g., rows). In particular, surrogate keys need not conform to a data format dictated by data formats external to the database. Accordingly, the use of surrogate keys can prevent wide spread changes to the database if the data content or type for a corresponding natural key changes (as one skilled in the art will appreciate). In the present disclosure, an agent surrogate key identifies a "version" of the agent, wherein the version of the agent is for a specific range of time.

Type 2: Database constraints related to the tracking and accessing of changes or versions of database entities (e.g., tables and entries thereof) through time, wherein such constraints prevent access to certain instances (or versions) of such entities that are outside of a predetermined time period. For example, if data for agent groups is modeled as Type 2, for an agent A that becomes a member of an agent group G at a particular time T, access (via the data model for group G) to data identifying activities performed by agent A would be restricted to only the time while agent A is a member of the group G. Thus, data identifying activities performed by agent A prior to time T would not be accessible via the data model for the group G.

SUMMARY

A database entity schema architecture and operators therefor is disclosed for storing data providing information about membership of items in one or more groups, wherein when such a group is a simulated group, the architecture and operators therefor provide access to group item data related to activities of the group items prior to creation of the simulated group. In particular, even though the fundamental data architecture for groups (and other data entities) may be Type 2 (as this term is described in the Terms and Definitions sections hereinabove), the database entity schema architecture and operators disclosed herein provide for data access and management of information for simulated groups, wherein data related to activities of the group items (e.g., agents), e.g., prior to creation of the simulated group is accessible via the data model for the simulated group. However, when such a group is an actual group, the architecture and operators therefor constrain access to group item data related to activities of the group items prior to creation of the group such that group entities have database Type 2 behavior. The architecture provides a common entity schema for both actual and simulated groups. The architecture is particularly useful for providing the ability to create simulated or hypothesized groups of agents in a contact center, wherein the groups can be evaluated using past performance of the agents. However, such groups are represented by the same data schemas as actual groups, and the data entities for the actual groups exhibit Type 2 database behavior.

Said another way, the database method and data architecture disclosed herein provides Type 2 database constraints related to the tracking and accessing of changes or versions of database entities (e.g., tables and entries thereof) through time while allowing certain instances of such entities to be created whereby such Type 2 constraints are relaxed. In particular, for certain group data entities, such Type 2 constraints are relaxed. That is; for an instance of such a group data entity, there is a relaxation of a Type 2 constraint that typically prevents access to data for evaluating the group items, wherein this data is for activities performed prior to the creation of the group. More particularly, the present disclosure is directed to providing a capability for incorporating data representing a simulated group into a group entity data schema whose instances also represent actual groups, wherein data for such a simulated group can be used to access historical data for items of the simulated group independently of the time of creation of the simulated group. In one especially important embodiment disclosed herein, the simulated groups are groups of agents for a contact center, wherein for each simulated group, the performance data of the agents for the simulated group is accessible via database keys for the simulated group wherein the performance data relates to agent tasks performed well before creation of the simulated group. Thus, for a simulated agent group, performance data for agents of the group from, e.g., 6 months or longer, prior to the creation of the simulated group is accessible via one or more database keys for the simulated group so that an agent performance simulation program can readily access such agent data.

Moreover, the present disclosure also allows such simulated groups to be readily converted to actual groups that then conform to the Type 2 database constraints for groups described hereinabove.

Additionally, in at least one embodiment, the method and data architecture herein allows a report generator for producing reports on the performance of actual agent group of a contact center agent to also generate correspondingly formatted reports for such simulated groups. In particular, a database entity architecture used by legacy report generators for accessing agent performance data via group data entities can be converted according to the method and data architecture disclosed herein so that such a legacy report generator can print similar reports on simulated groups.

In one embodiment the method and data architecture disclosed herein is for simulating a group of one or more agents, wherein the following steps (A) through (C) are performed:
(A) providing access to at least a first instance of a predetermined group data entity type, wherein each instance of the group data entity type corresponds to a group of one or more agents, and each instance provides access to:
  (a-1) at least one key for identifying the corresponding group,
  (a-2) a timestamp field having a time value identifying an earliest date for accessing data indicative of a performance of agents in the corresponding group;
  (a-3) a group type field having a value identifying the corresponding group as one of:
    (i) an actual group of agents, wherein performance data ($PD_1$) for the agents of the actual group is associated with the instance for determining an actual performance of the corresponding group, and wherein the performance data $PD_1$ corresponds to agent tasks performed substantially no earlier than a creation of the actual group, and
    (ii) a simulated group of agents, wherein performance data ($PD_2$) for the agents of the simulated group is associated with the instance for determining a performance of the simulated group, and wherein the performance data $PD_2$ corresponds to agent tasks performed from a time sufficiently prior to a creation of the simulated group so that the time is at least as early as the earliest agent data that is desired to be accessed to prior to the creation of the corresponding group;
  wherein the first instance provides access to a first value according to (a-3)(i) indicating that the corresponding group ($G_1$) for the first instance is an actual group, and the timestamp field for the first instance includes a time value related to the creation of $G_1$;
(B) creating a second instance of the group data entity type, wherein the second instance provides access to a second value according to (a-3)(ii) indicating that the corresponding group ($G_2$) for the second instance is a simulated group, and the timestamp field for the second instance includes a time value (T) sufficiently prior to the creation of $G_2$ so that the time value T is at least as early as the earliest agent performance data that is desired to be accessed to prior to the creation of $G_2$; and
(C) determining a performance measurement of the corresponding group $G_2$ for the second instance, wherein for one or more agents of $G_2$, corresponding agent performance data prior to creation of $G_2$ is used.

In a more general context, the method and data architecture disclosed herein provides a method for simulating a group, including the steps (D) through (G) following:
(D) providing a predetermined group database entity type wherein each instance of the group database entity type includes:
  (d-1) an identification storage area for identifying a corresponding group of items, and
  (d-2) a group type storage area for identifying the corresponding group as one of:
    (i) an actual group of one or more items, and
    (ii) a simulated group of one or more items;
    wherein the predetermined group database entity type defines a substantially entire data organization for each instance of the group database entity type within a data repository;
(E) providing access to at least a first instance of the predetermined group database entity type using a value in the identification storage area of the first instance, wherein a value for the group type storage area identifies the first instance as corresponding to an actual group ($G_1$) of one or more items;
  wherein for evaluating a performance of the first instance, item performance data ($ED_1$) associated with the items of the actual group $G_1$ is accessed according to Type 2 constraints for accessing $ED_1$, wherein the item performance data $ED_1$ is substantially for a time period no earlier than a creation of the actual group $G_1$;
(F) creating a second instance of the predetermined group data entity type, wherein the second instance corresponds to a simulated group ($G_2$) of one or more items;
  wherein the step of creating includes storing a predetermined time value for determining, for the items of $G_2$, the earliest date for item performance data that is desired for simulating an evaluation of $G_2$, wherein the predetermined time value is substantially prior to the creation of $G_2$;

(H) evaluating a performance of the simulated group $G_2$, wherein item performance data ($ED_2$) associated with the items of the simulated group $G_2$ is accessed for determining the second evaluation;

wherein the accessing of the item performance data $ED_2$ is determined using the predetermined time value.

Other features and benefits of the method and data architecture disclosed herein are described and/or shown in the accompanying figures together with the description hereinbelow.

BRIEF DESCRIPTION OF THE DRAWINGS

FIG. 3C shows a representation of a group membership entity 40 according to the first embodiment of the method and data architecture disclosed herein, wherein the group membership entity 40 correspond to time $T_3$ on the time line of FIG. 1.

FIG. 3D shows a representation of a group membership entity 40 according to the first embodiment of the method and data architecture disclosed herein, wherein the group membership entity 40 correspond to time $T_4$ on the time line of FIG. 1.

FIG. 4A shows a representation of a group membership entity 150 together with modified and new agent data entities 20 according to a second embodiment of the method and data architecture disclosed herein, wherein the group membership entity 150 corresponds to time $T_1$ on the time line of FIG. 1.

FIG. 4B shows a representation of a group membership entity 150 together with modified and new agent data entities 20 according to the second embodiment of the method and data architecture disclosed herein, wherein the group membership entity 150 corresponds to time $T_2$ on the time line of FIG. 1.

FIG. 4D shows a representation of a group membership entity 150 according to the first embodiment of the method and data architecture disclosed herein, wherein the group membership entity 150 correspond to time $T_4$ on the time line of FIG. 1.

DETAILED DESCRIPTION

Figure 1:
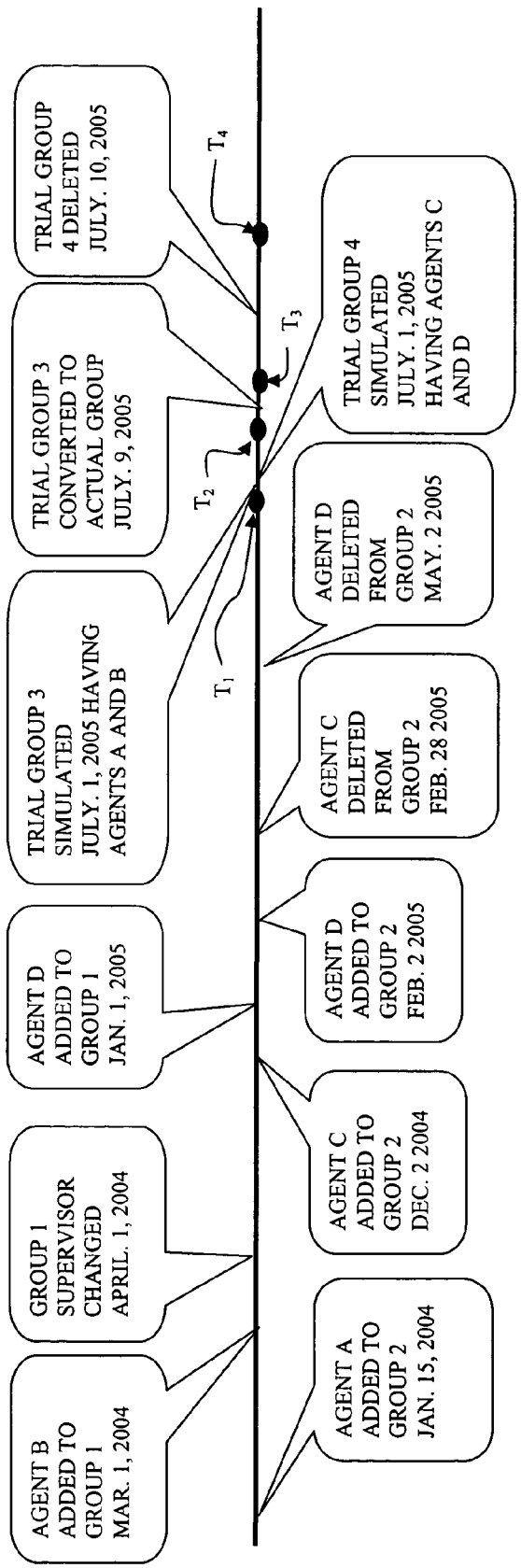
FIG. 1 is a time line showing the creation, deletion and modification of contact center agent groups.

FIG. 1 shows a time line of the relevant history of agents A, B, C, and D being added and deleted from various agent groups, and subsequently two trial groups (3 and 4) being created to simulate a performance of each of the trial groups according to the past performance of the agents in any of the groups 1 and 2. In particular, the time line prior to $T_1$ indicates that (i) agent A was initially added to group 2 (Jan. 15, 2004), (ii) agent B was added to group 1 (Mar. 1, 2004), (iii) agent C was initially added to group 2 (Dec. 2, 2004) and then deleted from group 2 (Feb. 28, 2005), and (iv) agent D was added to both group 1 and 2, and then deleted from group 2 (May 2, 2005). Immediately after time $T_1$ (Jul. 1, 2005) a contact center manager or supervisor ("user" herein) creates trial group 3 having agents A and B, and trial group 4 having agents C and D, wherein each of the trial groups provides access to all agent performance data (e.g., contact center tasks completed) from any predetermined date in the past (e.g., Jan. 1, 2000). Subsequently, trial group 3 is converted to an actual group (Jul. 9, 2005), followed by trial group 4 being deleted (Jul. 10, 2005).

Figure 2:
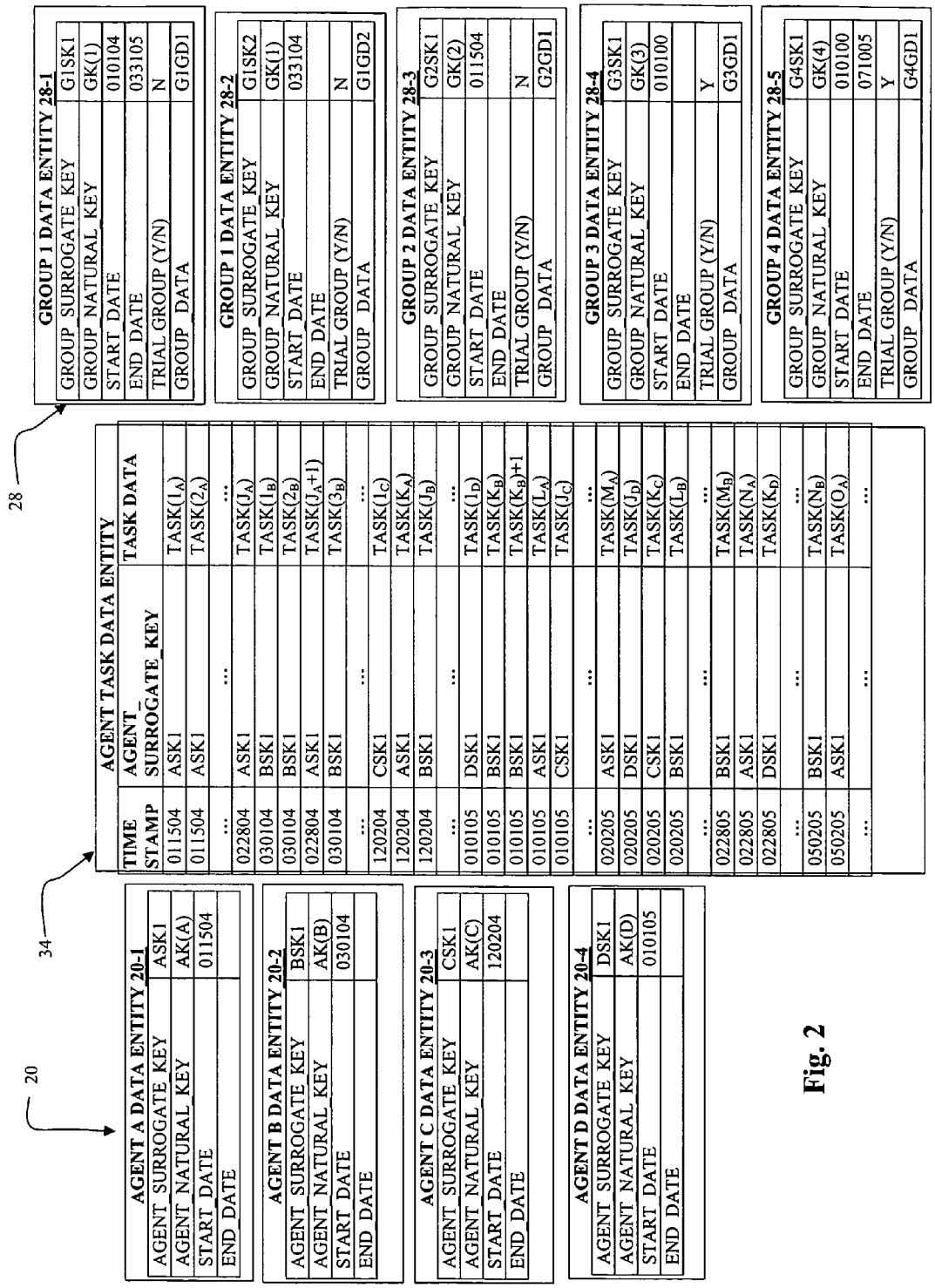
FIG. 2 shows representations of data entities for a first embodiment of the data architecture disclosed herein, wherein the data entities of this figure correspond to time $T_1$ on the time line of FIG. 1.

FIG. 2 shows a simplified representation of some of the data entities included in a database for retaining contact center information at time $T_1$. In particular, FIG. 2 shows data entities stored in such a database for identifying:

(1.i) agents (e.g., the agent data entities 20, labeled individually as 20-1 through 20-4) providing access to data specific to each of the agents A-D; note that in one preferred embodiment, each of the agent data entities 20 is an entry or row in a relational database table, or more generally, an instance of a predetermined database data type;

(1.ii) agent groups (e.g., the group data entities 28, labeled individually as 28-1 through 28-5); note that in one preferred embodiment, each of the group data entities 28 is an entry or row in a relational database table, or more generally, an instance of a predetermined database data type; and (1.iii) archived agent performance data (e.g., the agent task data entity 34) which in the present embodiment provides, a data entity or row for each task (of a predetermined set of tasks) performed by an agent. In particular, each such entity (also referred to as an "agent task data" entity) includes a timestamp indicating when the agent task was performed, a surrogate key for identifying the agent that performed the task, and an identification of the task performed (in the column headed "TASK DATA"); note that in one preferred embodiment, each of the agent task data entities may correspond to a row in a relational database table, or more generally, an instance of a predetermined database data type.

Regarding the agent data entities 20, each such entity (E) includes:

(2.i) A natural key (denoted "AGENT_NATURAL_KEY" in the data entities 20-1 through 20-4) that is used to uniquely identify a corresponding agent (e.g., such a natural key provides data that uniquely provides access to all data identified with the agent). For simplicity of description, the natural key is AK(A) for agent A, AK(B) for agent B, and AK(C) for agent C. Thus, the data entity 20-1 for agent A has the value "AK(A)" as the value of the agent's natural key. However, it is within the scope of the present disclosure that various data representations can be used for such values, as one skilled in art will understand.

(2.ii) A surrogate key (denoted "AGENT_SURROGATE_KEY" in the data entities 20-1 through 20-4) that is used to associate at least a portion of the data for the agent identified by the entity E. In particular, each such surrogate key can be used to identify one or more entities (e.g., also denoted "entries" herein) in the agent task data entity 34 (FIG. 2), wherein each of the entries in the agent task data entity 34 provides information about a contact center task that an agent (identified in the corresponding agent data entity 20) has performed. Thus, each instance of the AGENT_SURROGATE_KEY field (in an agent data entity 20) can be used to identify zero, one, or more entries in the agent task data entity 34.

For simplicity of description, the surrogate keys have the following format: xSK, where "x" is replaced with "A" for agent A, "B" for agent B, "C" for agent C, and "D" for agent D. Moreover, for each agent, there is exactly one AGENT_SURROGATE_KEY value that can be used for accessing the data describing a particular task performed by the agent (i.e., this data being in a corresponding entry in the agent task data entity 34 described hereinbelow). Thus, for agent D, agent data entity 20-4 has an AGENT_SURROGATE_KEY OF "DSK1", which identifies all agent D entries in the agent task data entity 34 having data describing the (any) task(s) performed by agent D during the time period starting at Jan. 1, 2005 (this date identified by the "START_DATE" field of agent data entity 20-4).

(2.iii) A start date field (denoted "START DATE" in the data entities 20-1 through 20-4), wherein the "START DATE" field identifies the starting date upon which the corresponding surrogate key identifies entries in the agent task data entity 34 that were performed on or after this date. Note that in some embodiments, each agent data entity 20 may also include an "END DATE" field for identifying, e.g., the ending date through which the corresponding surrogate key identifies entries in the agent task data entity 34 that were performed before or on this ending date.

Regarding the agent group data entities 28, each such entity includes:

(3.i) A natural key (denoted "GROUP_NATURAL_KEY" in the data entities 28-1 through 28-5) that is used to identify an agent group (e.g., such a natural key provides data that uniquely provides access to all data identified with the agent group). For simplicity of description, the natural key is GK(1) for group 1, GK(2) for group 2, GK(3) for group 3, GK(4) for group 4, and GK(5) for group 5. Thus, the group data entity 28-1 for group 1 has the value "GK(1)" as the value of the group's natural key. However, it is within the scope of the present disclosure that various data representations can be used for such natural keys, as one skilled in art will understand.

(3.ii) A surrogate key (denoted "GROUP_SURROGATE_KEY" in the data entities 28-1 through 28-5) that is also used to uniquely identify a group data entity 28 as one skilled in the art will understand. For simplicity of description, the surrogate keys have the following format: GxSKi, wherein:

"x" is replaced with "1" for group 1, "2" for group 2, "3" for group 3 and "4" for group 4, and "5" for group 5, and "i" is replaced with an integer identifying the next (first) group data entity 28 associated with the group. Each next value for "i" represents a subsequent time period in which a corresponding modified version of the group data entity 28 describes the group during the time period identified by at least the "START_DATE" field (and by the "END_DATE" field as well if this field is filled-in).

Thus, for group 1, group data entity 28-1 has a GROUP_SURROGATE_KEY OF "G1SK1", which identifies the group 1 descriptor information applicable during the time period of Jan. 1, 2005 through Mar. 31, 2005 (these dates identified by the "START_DATE" and "END_DATE" fields of group 1 data entity 28-1). Additionally, the group data entity 28-2 for group 1 has a GROUP_SURROGATE_KEY OF "G1SK2", which identifies the group 1 descriptor information applicable during the time period of Mar. 2, 2005 through a present date. Note, however, that it is within the scope of the present disclosure that various data representations can be used for values of the GROUP_SURROGATE_KEY, as one skilled in the art will understand.

(3.iii) Start and end data fields (respectively denoted "START DATE" and "END DATE" in the data entities 28-1 through 28-5), wherein for each group data entity, its "START DATE" field identifies the starting date upon which the group data entity is applicable and its "END DATE" field identifies the ending date upon which the group data entity is not longer applicable. Thus, e.g., group data entity 28-1 is applicable to group 1 until the group's supervisor changed on Apr. 1, 2004 (FIG. 1), and following such change, group data entity 28-2 became the applicable data describing group 1. Note that in the present embodiment an agent change to a group does not cause a new version of a group's data entity 28 to be generated. However, it is within the scope of the present disclosure that versioning of a group data entity 28 could be dependent upon agent changes to the corresponding group as one skilled in the art will understand.

(3.iv) A trial group tag (represented by the "TRIAL_GROUP" field) whose value identifies whether the corresponding group is a trial (i.e., simulated) group, or an actual group.

(3.v) One or more fields for describing the group, such as an identification of the group's supervisor, the group's location, the type of tasks handled by agents of the group.

Note that the data organization or model for group entities typically constrains such group entities to be Type 2 database entities. In particular, for actual groups, it is generally considered beneficial that their corresponding group entities be restricted from accessing agent performance data that is outside of the time range that the agent is a member of the group since such a restriction reduces the likelihood of a group evaluation process erroneously using agent performance data that does not coincide with member in the group. However, in the data architecture and method disclosed herein, such Type 2 restrictions may be dependent upon whether such a group entity is designated as an actual group or a simulated group. That is, actual groups may be Type 2 when determining group performances, and simulated groups are not Type 2 when simulating group likely performances.

Regarding the agent task data entity 34, for each row of this entity there are the following fields:

- (4.i) An agent surrogate key identifying an agent.
- (4.ii) One or more fields identifying a task performed by the agent corresponding to the agent surrogate key of (4.i).
- (4.iii) A timestamp field (denoted "TIMESTAMP") for identifying the date and time that the task identified in (4.ii) was performed by the agent identified by the surrogate key of (4.i). Note that for simplicity the "TIMESTAMP" fields only show the date. Thus, for the first entry in the agent task data entity 34, the value "011504" represents the date Jan. 15, 2004.

Figures 3A, 3B:
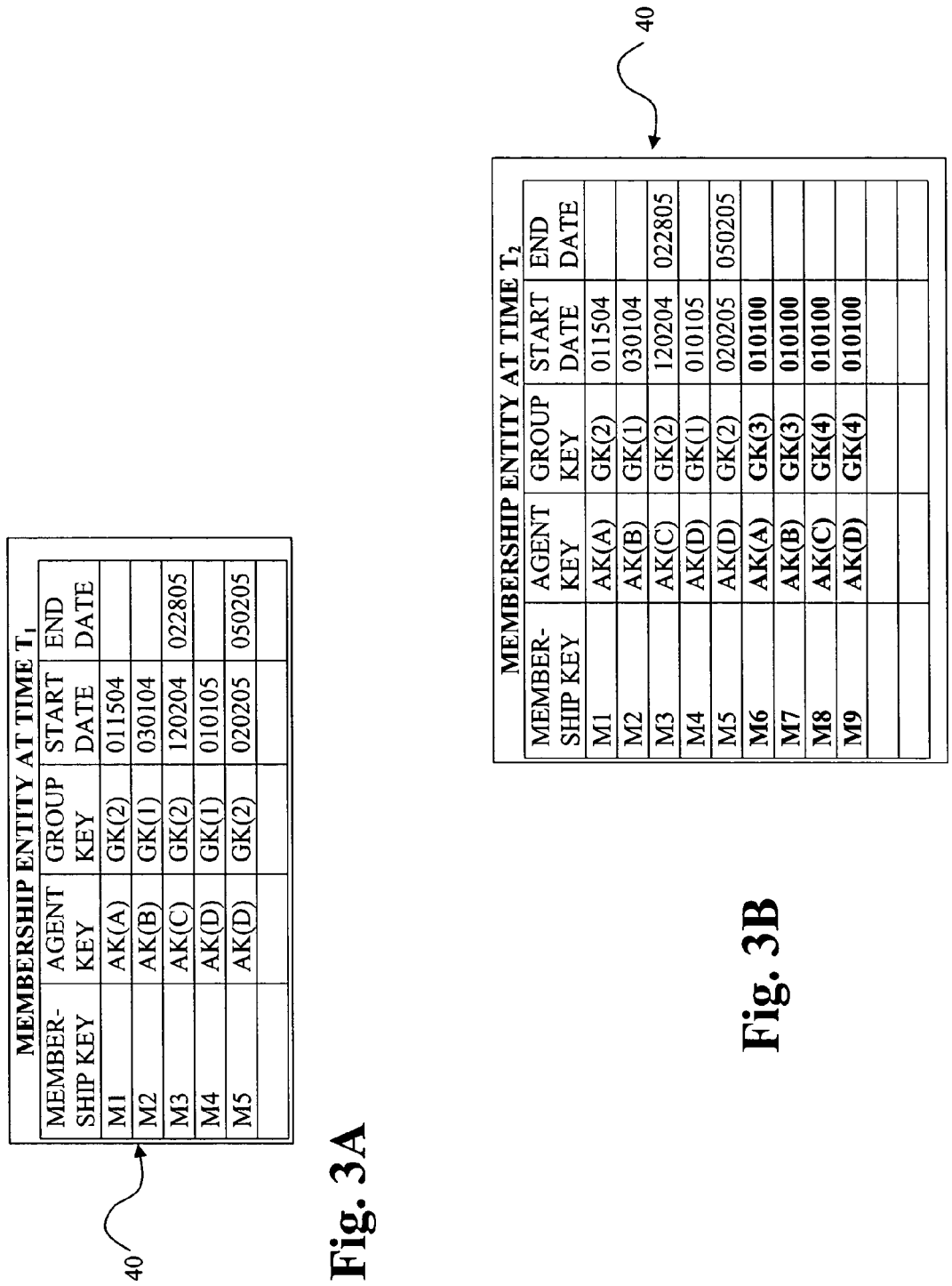
FIG. 3A shows a representation of a group membership entity 40 according to a first embodiment of the method and data architecture disclosed herein, wherein the group membership entity 40 correspond to time $T_1$ on the time line of FIG. 1.
FIG. 3B shows a representation of a group membership entity 40 according to the first embodiment of the method and data architecture disclosed herein, wherein the group membership entity 40 correspond to time $T_2$ on the time line of FIG. 1.

In addition to the data entities illustrated in FIG. 2, information must be retained for identifying the membership of agents in groups. In particular, for each group, the agents in the group and the time the agent is in the group needs to be captured. FIG. 3A shows a first embodiment 40 of such a membership data entity for retaining information about agent membership in groups. In particular, the membership entity 40 of FIG. 3A is representative of, e.g., the time $T_1$ (FIG. 1). The membership entity 40 includes a plurality of associated fields (each such association represented here as a row in the membership entity 40), wherein each row includes the following fields:

- (5.i) A membership key (denoted "MEMBERSHIP KEY") uniquely identifying the row.
- (5.ii) An agent key (denoted "AGENT KEY") that uniquely identifies an agent. Note that in the present embodiment, the agent key is the natural key for the agent.
- (5.iii) A group key (denoted "GROUP KEY") that uniquely identifies a group in which the agent is a member. Note that in the present embodiment group natural keys are used for identifying the group in which the agent identified in (5.ii) is a member. However, it is within the scope of the present disclosure for group surrogate keys to be used instead, as one skilled in the art will understand.
- (5.iv) A date and time stamp (denoted "START DATE") for retaining the date and time that the agent was added to the group identified in (5.iii). Note that for simplicity the "START DATE" fields only show the date. Thus, for the first entry in the agent task data entity 34, the value "011504" represents the date Jan. 15, 2004.
- (5.v) A date and time stamp (denoted "END DATE") for retaining the date and time (if available) that the agent was removed from the group identified in (5.iii). Note that for simplicity the "END DATE" fields only show the date. Thus, for the third entry in the agent task data entity 34, the value "022805" represents the date Feb. 28, 2005.

Figure 5:
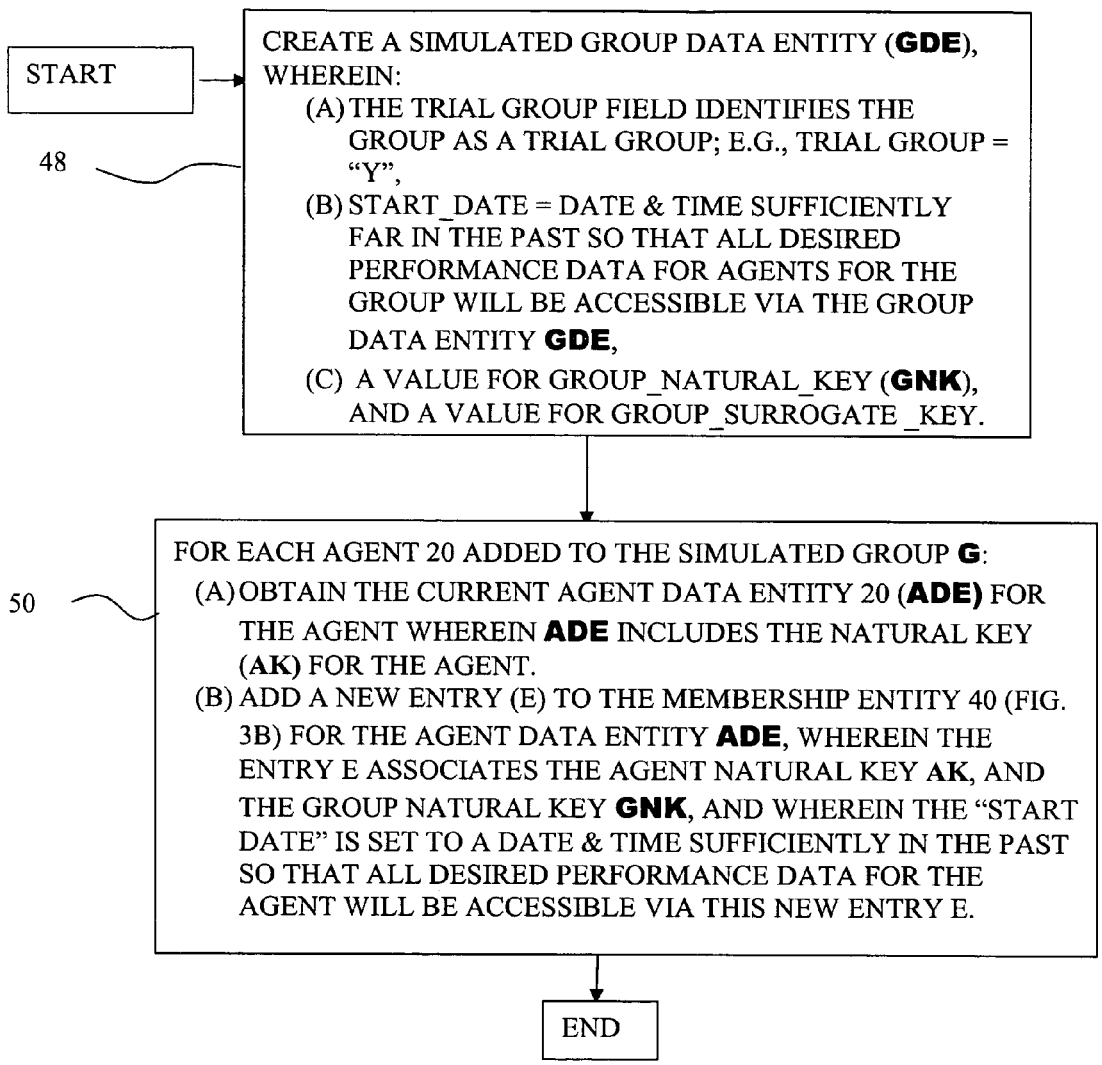
FIG. 5 shows a representation of a flowchart of the steps performed when creating a simulated group according to the first embodiment of the method and data architecture herein.

FIG. 5 is a flowchart showing the high level steps performed when creating a simulated agent group (also, equivalently denoted a "trial group" herein) according to the present first embodiment of the method and data architecture disclosed herein. In particular, in step 48, a trial or simulated group data entity 28 (GDE) is created in the database, wherein the trial group field (i.e., "TRIAL GROUP") is set to identify the group data entity GDE as a simulated group. Additionally, the "START_DATE" field of GDE is set to a date and time sufficiently in the past so that all desired performance data for agents to be added to the simulated group will be accessible via the group data entity for the simulated group. Note that in FIG. 2, the group data entity 28-4 represents the group data entity for the simulated group 3, and the group data entity 28-5 represents the group data entity for the simulated group 4. Also, a surrogate group key is provided to identify additional versions of various data fields for each of the trial groups.

Subsequently, in step 50, the following substeps are performed for each agent to be added to the simulated group G:

- (A) Find (or access) the agent data entity 20 (ADE) for the agent, wherein this agent data entity includes the natural key (AK) for the agent to be added.
- (B) For each agent data entity 20 ADE, add a new entry (E) to the membership entity 40, wherein the entry E associates the natural key value AK with the simulated group natural key GNK. Additionally, the start date for the new membership entry is set to a date and time sufficiently in the past so that all desired performance data for the agent will be accessible via this entry. Note that entries identified as M6 and M7 of membership entity 40 (FIG. 3B) illustrate the entries that are added in this substep for simulated agent group 3 (wherein the "START DATE" identifies Jan. 1, 2000), and entries identified as M8 and M9 of membership entity 40 illustrate the entries that are added in this substep for simulated agent group 4.

Note that after a simulated group is created (regardless of whether the data organization and method is according to the first embodiment hereinabove, or the second embodiment described hereinbelow), various simulations can be performed on historical agent data for agents in the simulated group. For example, the following simulations may be performed:

- (6.i) Determine an average number of customer contacts processed per day by the agents of the simulated group, wherein the average is determined from historical agent data for each agent from only the previous year; such an average may be used as a measure of an expected performance of the simulated group.
- (6.ii) Determine for each agent of the simulated group, the agent's maximum number of customer contacts processed in a three month period; wherein when such a maximum is determined for each agent, the sum of these maximums over all agents of the simulated group is likely to be an upper bound on the group's performance.
- (6.iii) Determine for each agent of the simulated group, the agent's minimum number of customer contacts processed in a three month period (such that the agent was in a full-time customer contact position); wherein when such a minimum is determined for each agent, the sum of these minimums over all agents of the simulated group is likely to be a lower bound on the group's performance.
- (6.iv) Determine any of the above simulations for a particular type of customer contact, such as customer contacts for merchandise returns, or customer contacts for accounting inquiries.

Note that to perform such simulations, the simulated group is identified, e.g., by the group's natural key, then using this key, the membership entity 40 is accessed for determining the natural key for each agent of the simulated group. Then using the agent natural keys, the corresponding agent data entities 20 are accessed for obtaining the agent's surrogate keys, and these surrogate keys are then used to access archived agent task data via the agent task data entity 34. In particular, the task data (also referred to as "agent performance data" herein) in the "TASK DATA" field of the entries in the entity 34 may be accessed for each agent of the simulated group once it is determined that the corresponding "TIME STAMP" field for such entries is within the time range that is desired for retrieving such task data in order to simulate the performance of the simulated group. Such a time range may be from a predetermined time previous to the creation of the simulated group and extend to substantially to a present time. However, it is within the scope of the present disclosure to also calculate a performance measurement of a simulated group according to one or more time ranges, wherein such time ranges may have predetermined upper time limits as well. Thus, the likely performance for a simulated group may be determined using a particular year as the time range, or, e.g., a time range specific to each agent such as the latest year that the agent performed a particular type of contact center task.

Further note that similar performance measurements may also be obtained for actual groups. However, since an actual group is preferably restricted to Type 2 behavior, agent task data prior to an agent joining the actual group is typically not available for determining a group performance measurement.

Figure 6:
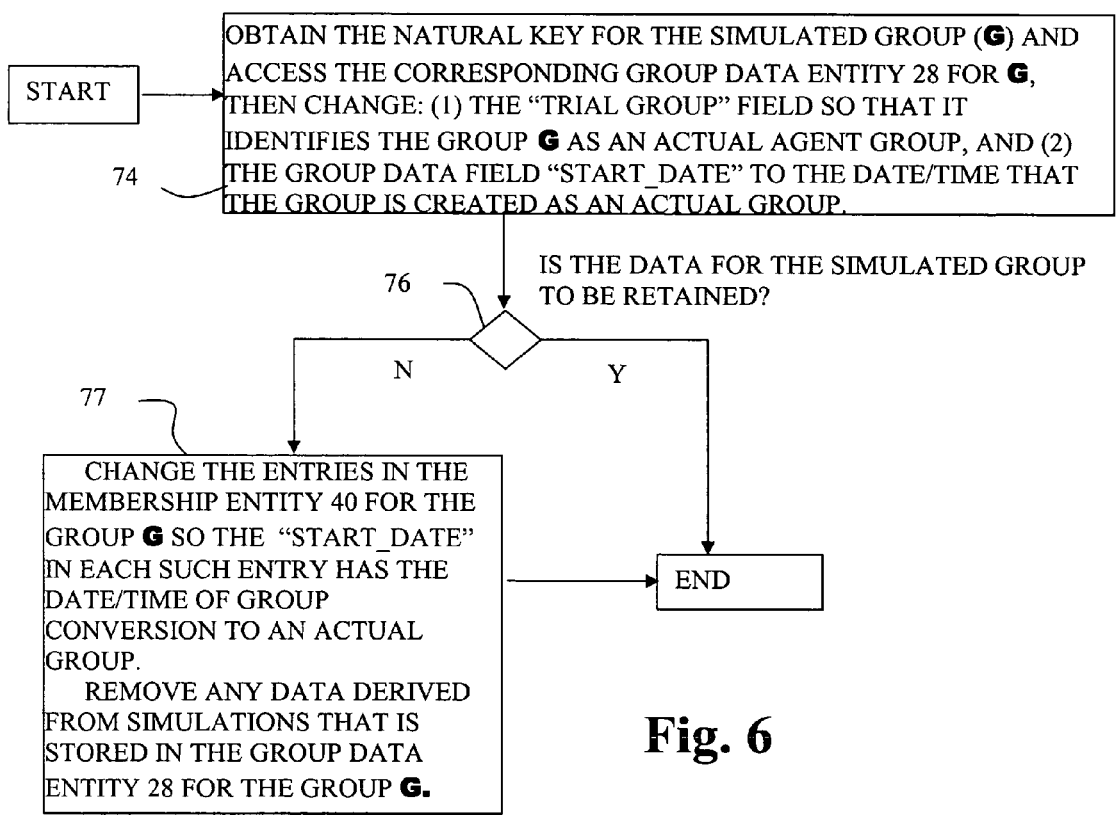
FIG. 6 shows a representation of a flowchart of the steps performed when a simulated group is converted to an actual group according to the first embodiment of the method and data architecture herein.

Subsequently, referring to FIG. 1 again, after time $T_2$ the simulated group 3 is converted to an actual group. FIG. 6 shows the high level steps performed when a simulated group is converted to an actual group according to the first embodiment of the method and data architecture disclosed herein. Accordingly, in step 74, the natural key for the simulated group (G) is obtained, and this natural key is used to access the corresponding group data entity 28 for the group. Once the group data entity 28 is accessed: (1) change the simulated group field so that it identifies the group G as an actual agent group (i.e., set the "TRIAL GROUP" field to "N"), and (2) change the group data field "START_DATE" to the date and time that the simulated group is converted to an actual (i.e., non-simulated) group (rather than a date in the past used for accessing agent's records during simulations). Subsequently, in step 76, a determination is made as to whether the data related to simulations performed on the simulated group G is to be retained after the group is converted to an actual group. For example, such simulations may yield an expected performance of the group G such as a total number of customer contacts per month that is expected to be processed by group members. Note that such simulation data may be subsequently used to:

(7.i) calibrate or verify the accuracy of a simulation technique for predicting a performance of simulated groups that are converted to actual groups;

(7.ii) determine performance goals for the converted group;

(7.iii) determine a plurality of new agent groups, wherein simulations of each of the new groups, indicate that the groups should all perform similarly. Note that such balancing of agent groups may be desirable to motivate groups to compete with one another; and/or (7.iv) determine how well a supervisor performs in managing a converted agent group in comparison to a predicted group performance derived from simulations of the group.

If it is determined in step 76 (FIG. 6) that historical agent performance data is to be disassociated from the converted group, and any group simulation data is to be deleted, then step 77 is performed. Accordingly in step 77, entries in the membership entity 40 for the group have their "START_DATE" changed to the date and time that the simulated group is being converted to an actual group. Additionally, any derived group simulation information accessible via the group natural key is also deleted. It is, however, within the scope of the present disclosure to retain such derived group simulation information even though the historical agent performance data (from which such simulation information is obtained) is no longer accessible from the group data entity.

Alternatively, if it is determined in step 76 that agent and/or group performance data for the simulated group is to be retained, then the flowchart of FIG. 6 ends.

FIG. 3C shows the membership entity 40 at time $T_3$, and the modified group 3 data entity at time $T_3$, wherein modified fields are in bold.

Figure 7:
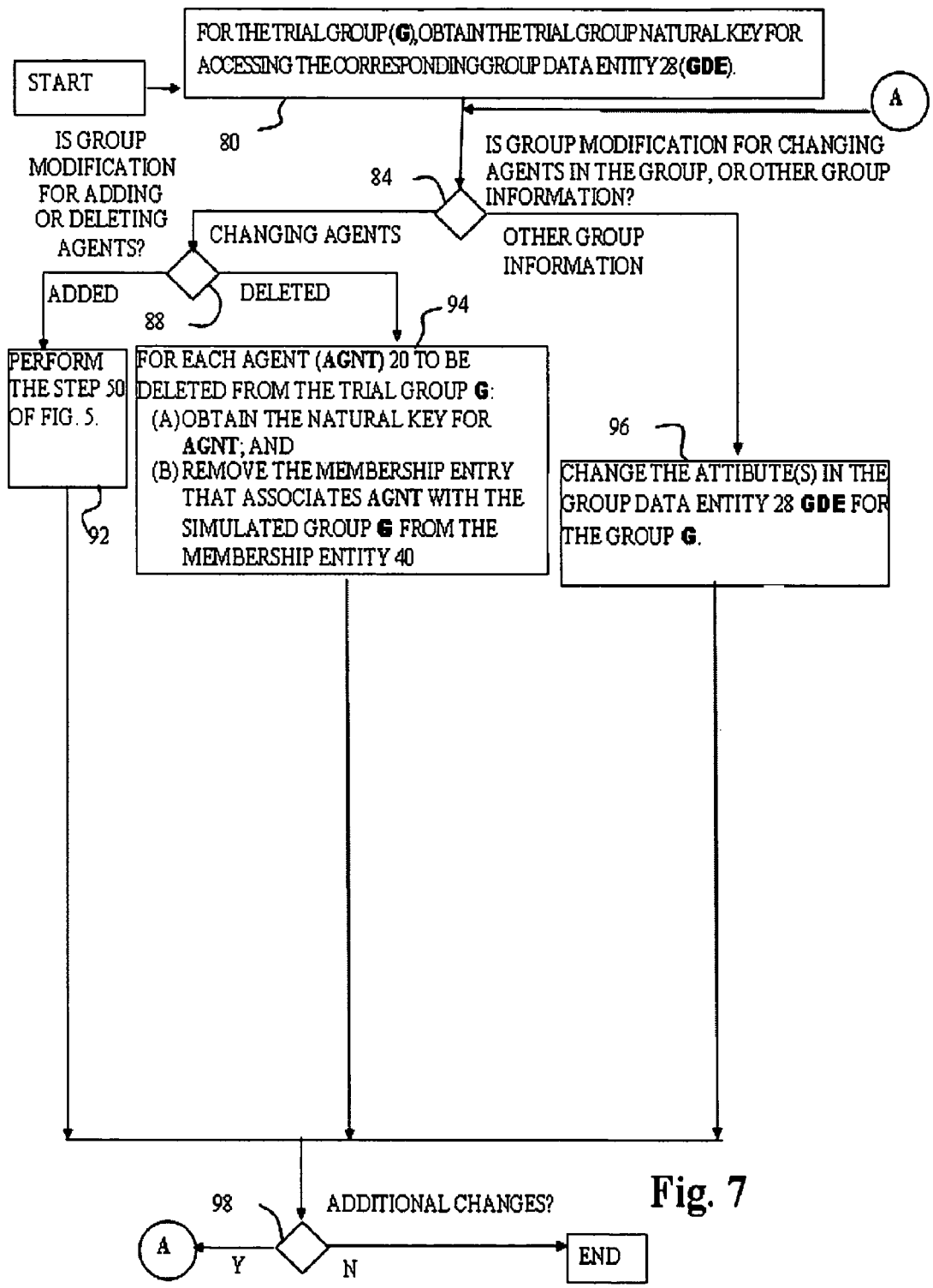
FIG. 7 shows a representation of a flowchart of the steps performed when a simulated group is modified according to the first embodiment of the method and data architecture herein.

In FIG. 7 a flowchart is shown illustrating the steps performed when a simulated group (G) is modified. In step 80, the natural key (i.e., the value for the GROUP_NATURAL_KEY field) of the group data entity 28 (GDE) of the simulated group is obtained. In step 84, a determination is made as to whether the modification to the simulated group is for changing one or more agents of the group, or changing some other group information (e.g., proposed group supervisor). If there is to be a change in the agents for the simulated group, then step 88 is performed wherein a determination is made as to whether an agent is to be added to the simulated group, or deleted from the simulated group. If an agent is to be added to the simulated group, then step 92 is performed, wherein the step 50 of FIG. 5 is performed. Alternatively, if an agent is to be deleted from the simulated group, then step 94 is performed, wherein the following substeps are performed:

(A) Obtain the natural key (e.g., from the agent data entity 20) for the agent (AGNT) to be deleted; and (B) Remove the membership entry that associates the agent AGNT with the simulated group from the membership entity 40.

Alternatively, if in step 84, it is determined that other data for the simulated group is to be modified, then step 96 is performed, wherein such other data (e.g., group supervisor, group agent call type assignments, group performance goals, etc.) is changed via accessing the group data entity 28 for the simulated group G.

Subsequently, regardless of the flow of control from step 84, step 98 is performed, wherein a determination is made as to whether there is at least one additional modification to be performed on the simulated group G. If not, then the flowchart ends. Alternatively, step 84 is again performed.

Figure 8:
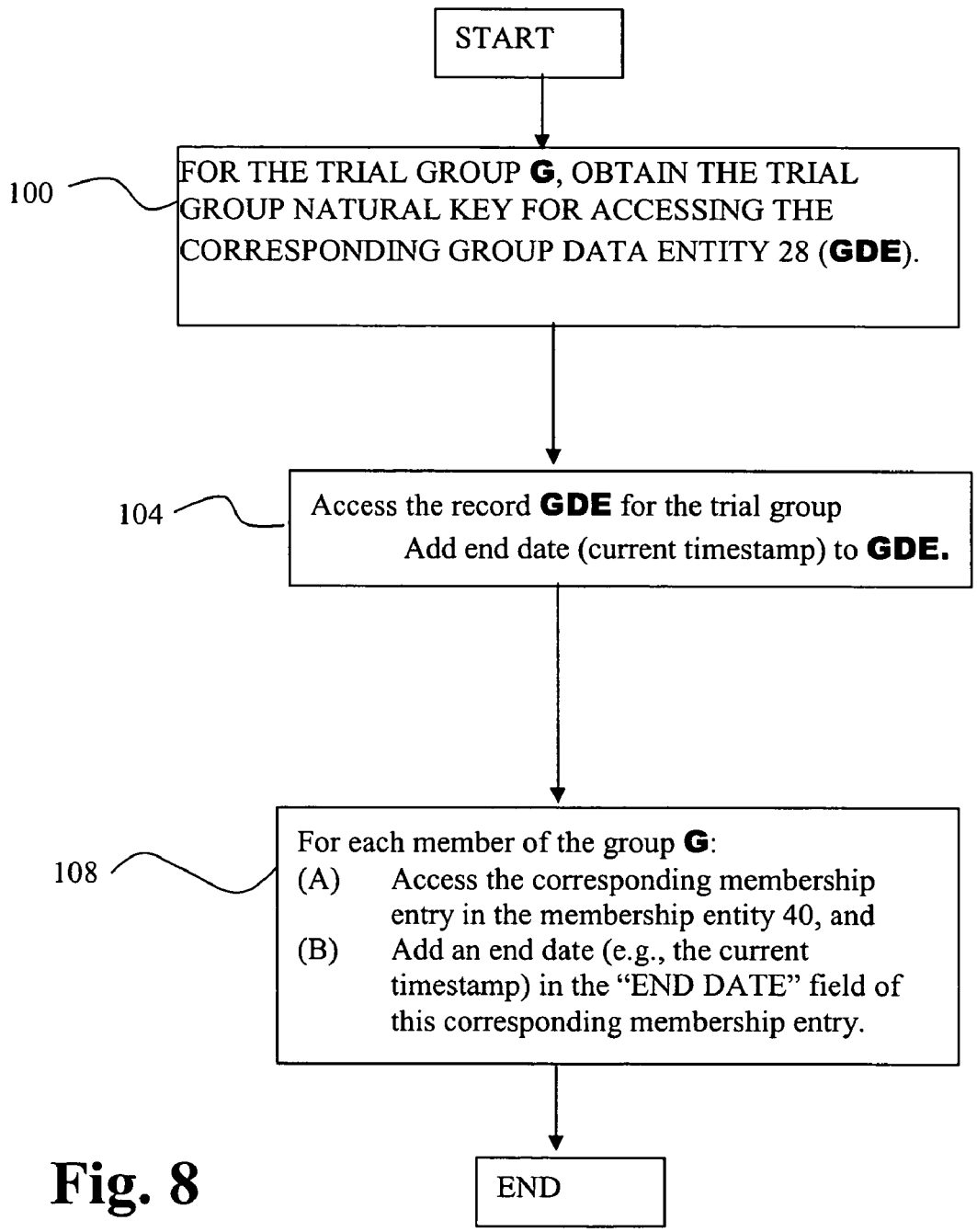
FIG. 8 shows a representation of a flowchart of the steps performed when a simulated group is deleted according to the first embodiment of the method and data architecture herein.

FIG. 8 shows a flowchart for the deletion of a simulated group as, for example, is performed between times $T_3$ and $T_4$ of FIG. 1. Accordingly, in step 100, the natural key for the trial group (G) is obtained, and in step 104, this natural key is used to access the group data entity 28 (GDE) for the group G, wherein the current date and time are then entered in the "END DATE" field of GDE. Subsequently, in step 108, for each agent of the group G, the corresponding membership entry (in the membership entity 40) that associates the agent with the group G is accessed and the current date is provided in the "END DATE" field of this entry.

FIG. 3D shows the membership entity 40 at time $T_4$, wherein modified fields are in bold.

Figure 4C:
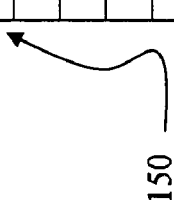
FIG. 4C shows a representation of a group membership entity 150 according to the second embodiment of the method and data architecture disclosed herein, wherein the group membership entity 150 correspond to time $T_3$ on the time line of FIG. 1.

A second embodiment of the method and data architecture disclosed herein is illustrated in FIGS. 4A through 4D, and FIGS. 9 through 12. That is (as with the first embodiment), the method and data architecture maintains Type 2 time-based database constraints on data entities, e.g., agent data entities 20, and agent group data entities 28 (for actual agent groups), whereas for a simulated group, access to agent data for agent performed tasks occurring substantially prior to the simulated group is accessible via one or more keys for the simulated agent group. In this second embodiment, agent surrogate keys are used in representing agent membership in groups. Thus, in FIG. 4A, a second embodiment 150 of the membership data entity is shown. In particular, the membership entity 150 of FIG. 4A is also representative of, e.g., the time $T_1$ (FIG. 1). Similar to the membership entity 40 described above, the membership entity 150 includes a plurality of membership associations (each such association represented here as a row in the membership entity 150), wherein each row includes the following fields:

(8.i) A membership key (denoted "MEMBERSHIP KEY") uniquely identifying the row.

(8.ii) An agent key that uniquely identifies an agent. Note that, instead of identifying an agent by his/her natural key (as in membership entity 40), in the membership entity 150 agent surrogate keys are used.

(8.iii) A group key that uniquely identifies a group in which the agent is a member. Note that group natural keys are used for identifying the group in which the agent identified in (5.ii) is a member. However, in one embodiment, the group's surrogate key may be used. Note that it is believed that group natural keys are generally sufficient to be used in the membership entity 150 since most modifications to a group (other than a change in one or more agents) are likely to be implemented in the data architecture disclosed herein by termination of the group, and subsequent creation of a corresponding new group. For example, if a new supervisor were assigned to an existing group, then it may be preferred to terminate the existing group, and commence a new group having the same agents as the previously existing group but with a new supervisor identified by the group's data entity 28.

Note that the first five entries of membership entity 150 of FIG. 4A correspond to the first five entries of membership entity 40 of FIG. 3A (with the exception that the entries in entity 150 do not include start and end dates). That is, for each membership entity 40 and 150:

M1 corresponds to agent A becoming a member of group 2 (on Jan. 15, 2004);

M2 corresponds to agent B becoming a member of group 1 (on Mar. 1, 2004);

M3 corresponds to agent C becoming a member of group 2 (on Dec. 2, 2004);

M4 corresponds to agent D becoming a member of group 1 (on Jan. 1, 2005); and M5 corresponds to agent D becoming a member of group 2 (on Feb. 2, 2005). Note, however, that the entry M5 of entity 150 includes a different surrogate key from entry M4. That is, in this second embodiment of the method and data architecture, when agent D is added to group 2, a new agent data entity 20-5 is created having a new surrogate key "DSK2", and this key is then used to identify that the agent D is a member of group 2 in the membership entity 150 (FIG. 4A), as described further hereinbelow. Moreover, since the previous version of the agent data entity (20-4) for agent D has been supplanted with a newer version, the "END DATE" field of 20-4 is filled-in as also shown in FIG. 4A.

Additionally, note that membership entity 150 of FIG. 4A also includes additional entries in comparison to membership entity 40 of FIG. 3A; i.e., M6 and M7. The entry M6 is due to what is known in the art as "backsplash", wherein in order to continue to reflect that agent D is in group 1 (after agent D is added to group 2), agent D's new surrogate key "DSK2" must be associated with the group key for group 1, i.e., GK(1). The entry M7 is due to agent D being deleted from group 2 on May 2, 2005; i.e., since agent data entities are Type 2 data modeling entities, a change to the agent D is reflected by creating an additional agent data entity 20-6 (FIG. 4A) that has a new surrogate key "DSK3" for agent D. Accordingly, to continue to reflect that agent D remains a member of group 1 (after being deleted from group 2), entry M7 is required in the membership entity 150 of FIG. 4A.

It is also important to note that since agent C was deleted from group 2 on Feb. 28, 2005, the agent data entity 20-3 is updated with an end date (FIG. 4A), and a new agent C data entity 20-7 is created having a new surrogate key "CSK2".

Figure 9:
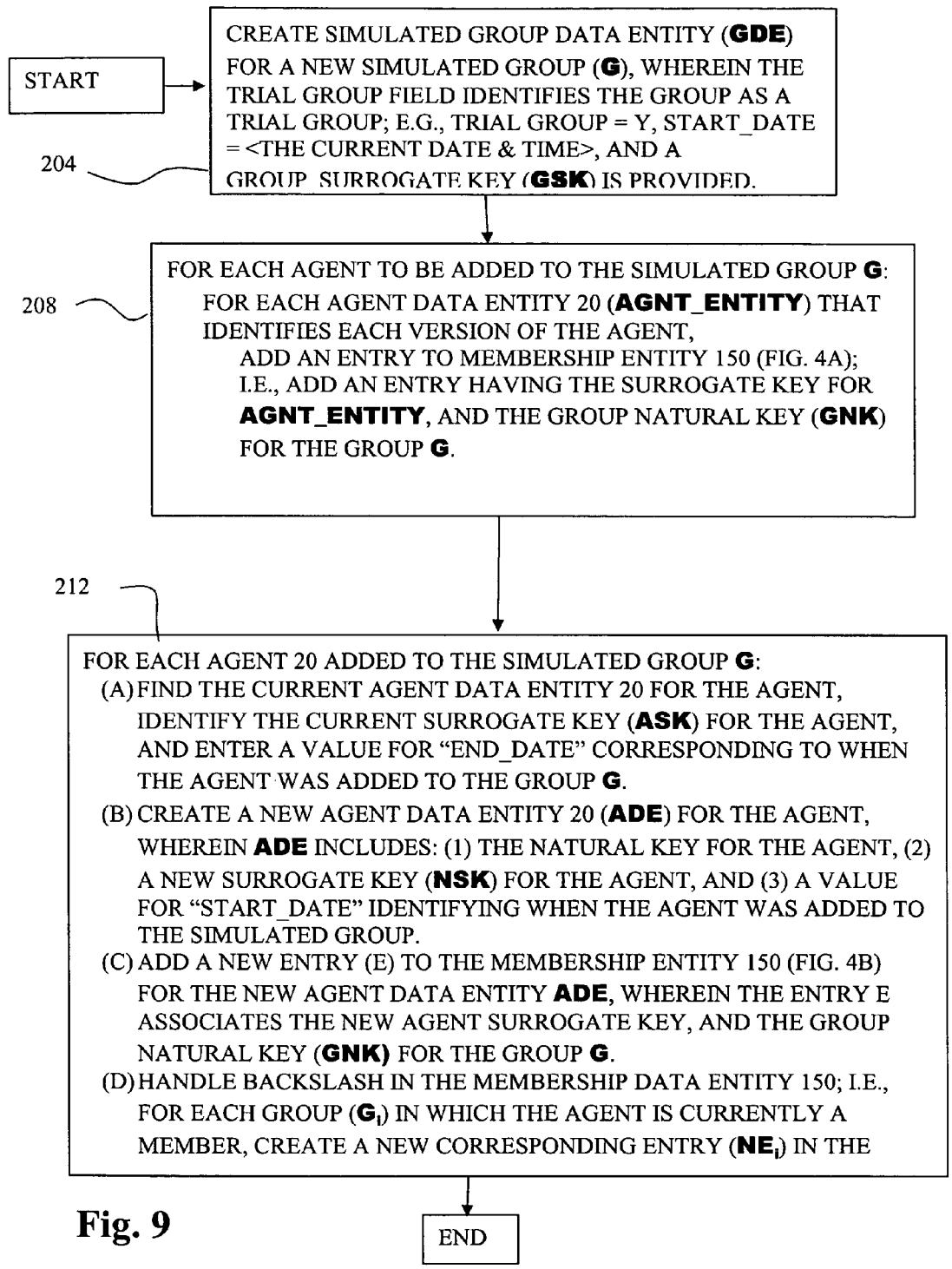
FIG. 9 shows a representation of a flowchart of the steps performed when creating a simulated group according to the second embodiment of the method and data architecture herein.

FIG. 9 is a flowchart showing the high level steps performed when creating a simulated agent group (also, equivalently denoted a "trial group" herein) according to the second embodiment of the present method and data architecture. In particular, in step 204, a trial or simulated group data entity 28 (GDE) is created in the database having the data schema and data of FIGS. 2 and 4A, wherein the trial group field is set to identify the group data entity GDE as a simulated group. Additionally, the "START_DATE" field of GDE is set to a current date and time. Also, a surrogate group key is provided to identify additional versions of various data fields for the group (identified as "GSK"). Subsequently, in step 208, for each agent to be added to the simulated group G, identify the current (i.e., most recent) agent data entity 20 (AGNT_ENTITY) that identifies the agent (for some portion of time, i.e., each version of the agent data entity for the agent). For each instance of AGNT_ENTITY, determine the surrogate key (AGENT_SURROGATE_KEY) value identifying the instance and add an entry to the membership entity 150 for associating the surrogate key value with a surrogate key value that identifies the most recent version of the simulated group G (see FIG. 4B, membership entity 150, entries M8 through M14).

Subsequently, in step 212, the following substeps are performed for each agent to be added to the simulated group G:

(a) Find the current (or most recently created) agent data entity 20 for the agent, and enter a value for the "END_DATE" field identifying the date that the agent is added to the simulated group G. Note that agent data entities 20-1, 20-2, 20-6, and 20-7 are modified in this substep so that their "END_DATE" fields are filled-in as illustrated in FIG. 4B.

(b) Create a new agent data entity 20 (identified as ADE here) for the agent, wherein ADE includes (1) a value (NSK) for the AGENT_SURROGATE_KEY field that will uniquely identify ADE, and (2) a value for the "START_DATE" field indicative of when ADE is to become the new current version of information identifying the agent (such a value will most likely be the current time and date value for the creation of the simulated group G). Note that the new agent data entries 20-8, 20-9, 20-10, and 20-11 (FIG. 4B) illustrate the entries that are created in various activations of this substep.

(c) For each new agent data entity 20 ADE, add a new entry (E) to the membership entity 150, wherein the entry E associates the new agent surrogate key value NSK with and the simulated group natural key (GNK) for the group G. Note that the entries identified as M8 and M9 of membership entity 150 (FIG. 4B) illustrate the entries that are added in this substep for simulated agent group 3, and entries identified as M12 and M13 of membership entity 150 illustrate the entries that are added in this substep for simulated agent group 4.

(d) Since the membership entity 150 must accurately reflect group membership by associating the most recent version of the agent's AGENT_DATA_ENTITY 20 with each group in which the agent is currently a member, additional new entries must be added to membership entity 150. In particular, for each group ($G_i$) in which the agent is currently a member, create a new corresponding entry ($NE_i$) in the membership entity 150, wherein $NE_i$ has the new surrogate key NSK associated with natural key for the group $G_i$. The entries M10, M11 and M14 of FIG. 4B illustrate the entries that are added in various activations this substep. Note, the process of this substep (d) is known in the art as "handling backsplash".

For example, after step 212 is performed for the two simulated groups 3 and 4 at time $T_3$ (FIG. 1), the resulting data entities includes: the data entities of FIG. 2, together with their modifications and new the AGENT_DATA_ENTITIES 20 of FIGS. 4A and 4B, and the version of the membership entity 150 of FIG. 4B.

Figure 10:
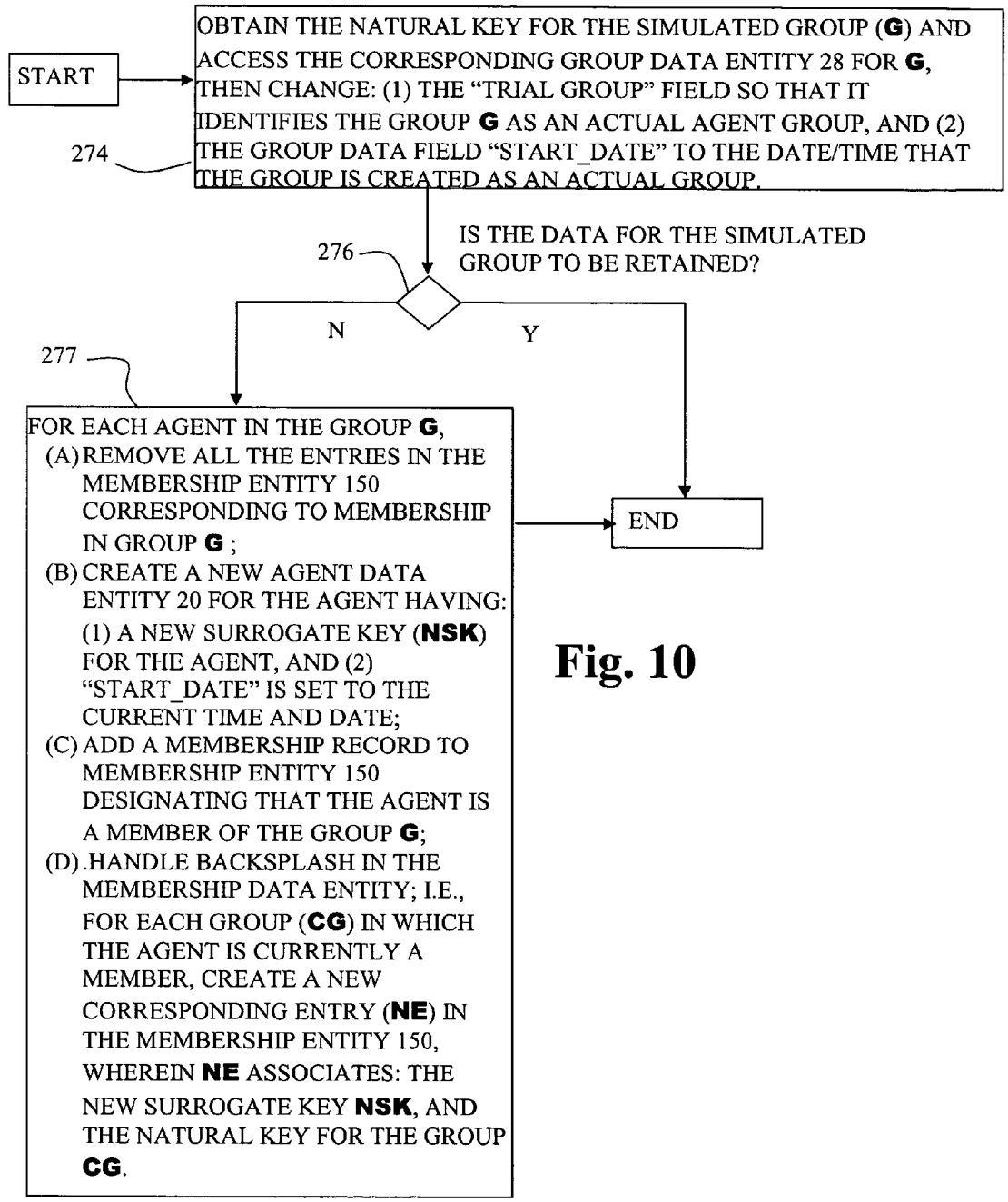
FIG. 10 shows a representation of a flowchart of the steps performed when a simulated group is converted to an actual group according to the second embodiment of the method and data architecture herein.

FIG. 10 shows the high level steps performed when a simulated group G is converted to an actual group according to the second embodiment of the method and data architecture disclosed herein. Note that steps 274 and 276 are identical to steps 74 and 76 of FIG. 6. However, if it is determined (in step 276) that data for the simulated group is not to be retained, then in step 277, for each agent (A) in the group G, the following substeps are performed:

(a) Remove all the entries in the membership entity 150 identifying the agent A as a member of the group G;

(b) Create a new agent data entity 20 for the agent A with (1) a new surrogate key (NSK) for the agent, and (2) the "START_DATE" set to the current time and date;

(c) Add a membership record (e.g., row) to the membership entity 150 designating that the agent A is a member of the group G; and (d) Activate an operation for "handling backsplash" from substep (c) above into the membership entity 150; i.e., for each group (CG) in which the agent is currently a member, create a new corresponding entry (NE) in the membership entity 150, wherein NE associates: the new surrogate key NSK, and the natural key for the group CG.

In particular, for each agent (AGNT) of the group G, each membership entry associated with an agent data entity 20 (for AGNT) having a "START_DATE" prior to the current "START_DATE" field of the group entity data 28 for the group G is removed. For example, in FIG. 4C shows the membership entity 150 after simulated group 3 is converted to an actual group, wherein entries M10 and M11 of FIG. 4B are removed. Alternatively, if all prior data for the simulated group is to be retained after conversion, then no modifications to the membership entity 150 are needed.

Figure 11:
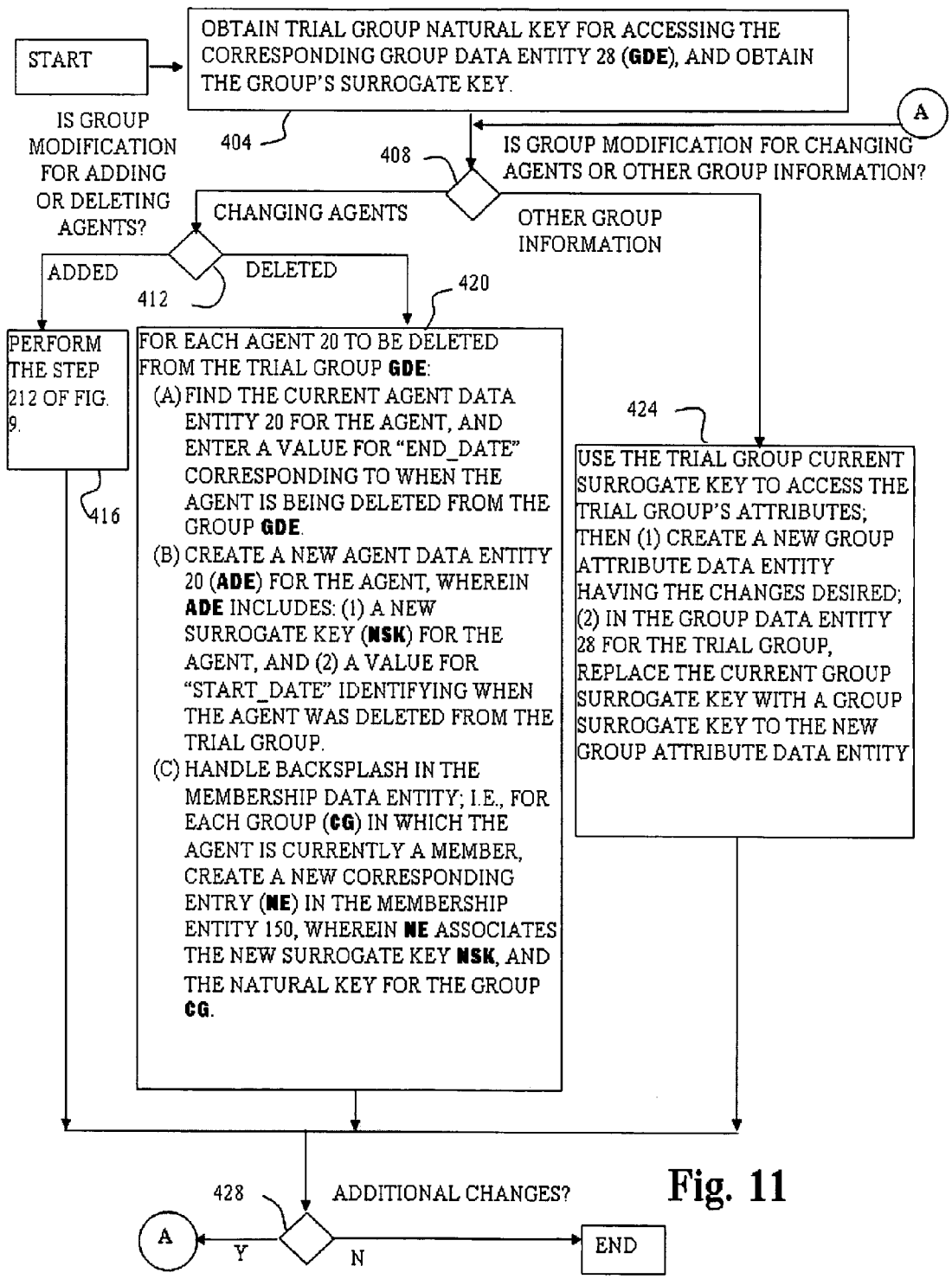
FIG. 11 shows a representation of a flowchart of the steps performed when a simulated group is modified according to the second embodiment of the method and data architecture herein.

In FIG. 11, a flowchart is shown illustrating the steps performed when a simulated group is modified according to the second embodiment of the method and data architecture. In step 404, the natural key (i.e., the value for the GROUP_NATURAL_KEY field) of the group entity data 28 (GDE) for the simulated group is obtained. In step 408, a determination is made as to whether the modification to the simulated group is for changing one or more agents of the group, or changing some other group information (e.g., proposed group name). If there is to be a change in the agents for the simulated group, then step 412 is performed wherein a determination is made as to whether an agent is to be added to the simulated group, or deleted from the simulated group. If an agent is added to the simulated group, then step 416 is performed, wherein the step 212 of FIG. 9 is performed. Alternatively, if an agent is to be deleted from the simulated group, then step 420 is performed, wherein the following substeps are performed:

(A) Find the current (or most recently created) agent data entity 20 for the agent to be deleted, and enter a value for the "END_DATE" field identifying the date that the agent is deleted from the simulated group.

(B) Create a new agent data entity 20 (identified as ADE) for the agent, wherein ADE includes (1) a new value (NSK) for the AGENT_SURROGATE_KEY field that will uniquely identify ADE, and (2) a value for the "START_DATE" field indicative of when the agent was deleted from the simulated group.

(C) Handle the backsplash in the membership entity 150 so that the membership entity 150 accurately reflects group membership by associating the most recent version of the deleted agent's AGENT_DATA_ENTITY 20 with each group in which the agent is currently a member (other than the simulated group from which the agent is being deleted), additional new entries must be added to membership entity 150. In particular, for each group (CG) in which the agent is currently a member, create a new corresponding entry (NE) in the membership entity 150, wherein NE has the new surrogate key NSK associated with current natural key for the group CG.

Alternatively, if in step 408, it is determined that other information for the simulated group is to be modified, then step 424 is performed. In the present embodiment, it is assumed that such "other group information" resides in a "group attribute data entity" (e.g., a record) that is distinct from the trial group data entity GDE. Accordingly, the trial group's current surrogate key may be used to access the trial group's current attributes, and once the desired changes are made to such current attributes, a new group attribute data entity is created having the desired changes. Subsequently, a new surrogate key for the group is generated which is used to access the new group attribute data entity, and a new "current" version of the group data entity is generated wherein this new version includes this new surrogate group key.

Subsequently, regardless of the flow of control from step 408, step 428 is performed, wherein a determination is made as to whether there is at least one additional modification to be performed on the simulated group. If not, then the flowchart ends. Alternatively, step 408 is again encountered.

Figure 12:
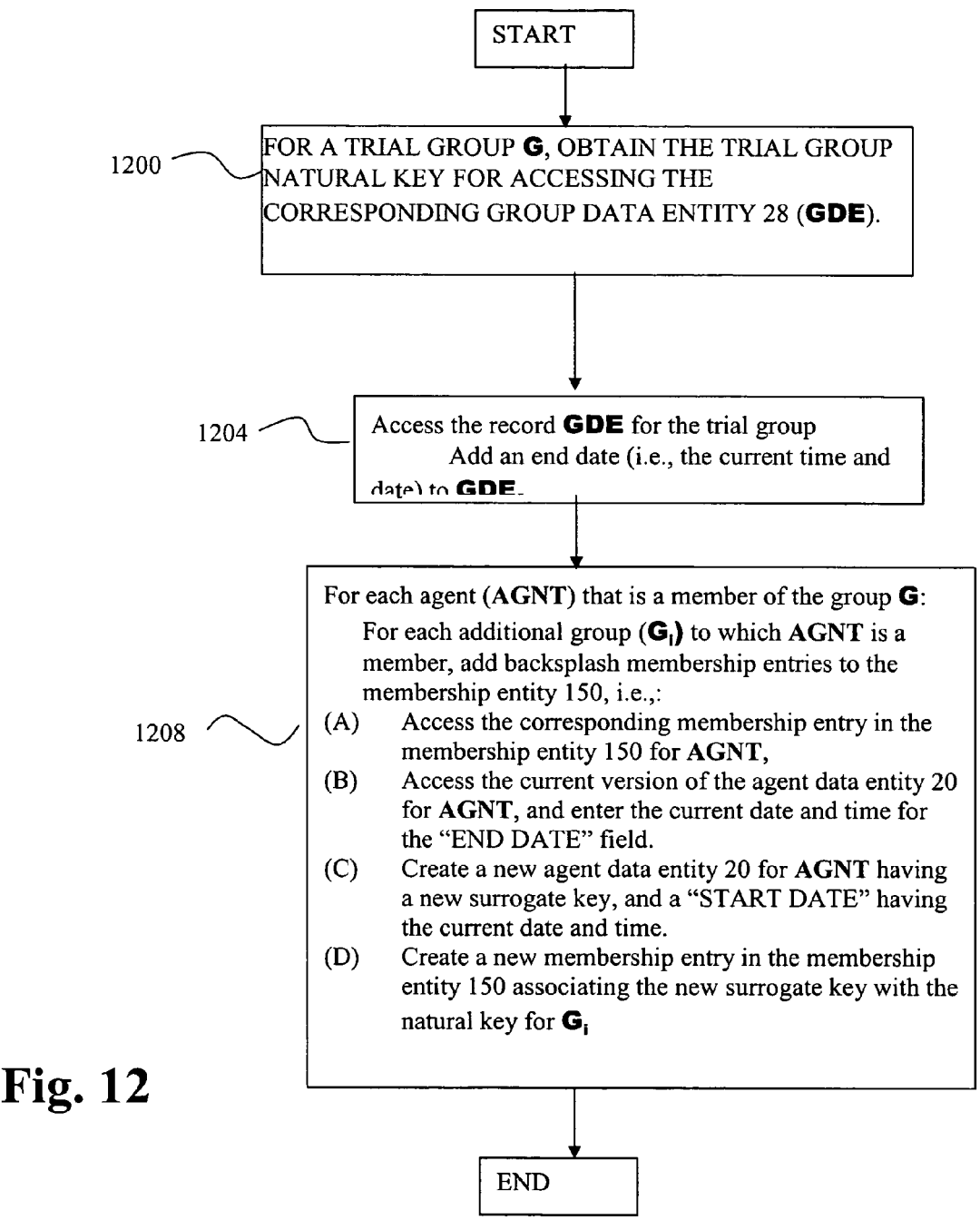
FIG. 12 shows a representation of a flowchart of the steps performed when a simulated group is deleted according to the second embodiment of the method and data architecture herein.

FIG. 12 shows the flowchart for the deletion of a simulated group according to the second embodiment of the method and data architecture. The steps of this flowchart are self explanatory in view of the description hereinabove.

To perform group simulations using the second embodiment of the of the method and data architecture disclosed herein, a simulated group is identified (e.g., by the group's natural key), then using this key, the membership entity 150 is accessed for determining the surrogate key for each agent of the simulated group. Then, using these agent surrogate keys, archived agent task data via the agent task data entity 34 is accessed. In particular, the task data (i.e., "agent performance data") in the "TASK DATA" field of the entries in the entity 34 may be accessed for each agent of the simulated group once it is determined that the corresponding "TIME STAMP" field for such entries is within the time range that is desired for retrieving such task data in order to simulate the performance of the simulated group. Such a time range may be from a predetermined time previous to the creation of the simulated group and extend to substantially to a present time. However, it is within the scope of the present disclosure to also calculate a performance measurement of a simulated group according to one or more time ranges, wherein such time ranges may have predetermined upper time limits as well. Thus, the likely performance for a simulated group may be determined using a particular year as the time range, or, e.g., a time range specific to each agent such as the latest year that the agent performed a particular type of contact center task.

The above described method and data architecture may be used in performing simulations of groups other than contact center agent groups, as well as other contact center managed resources such as VDNs (e.g., routing points) and/or agent skills (e.g., "queues", as one skilled in the contact center art will understand). For example, groups of sales representatives may be simulated using a similar data architecture and method, wherein past performance data for each salesperson may be related, e.g., dollar amount of merchandise sold. Moreover, squadrons (i.e., groups) of military personnel may be simulated using the method and data architecture disclosed herein, wherein past performance data for each military person may be related to past proficiency at certain military skills. Further, the method and data architecture disclosed herein may be used for capturing data related to the projected sales of various combinations of telecommunications features, as one skilled in the art will understand. For example, the data architecture and method described herein may be used for simulating the likely commercial success of various packages of telecommunications services, and for retaining the historical data upon which the simulation(s) were performed; e.g., the historical data may include sales of particular services and their users.

Moreover, as one skilled in the art will understand, the data entities disclosed hereinabove can be readily implemented in a relational database architecture such that each of the data entities (and/or instances thereof) hereinabove are embodied in one or more relational database tables. Moreover, since a database providing the database entity schema architecture and operators disclosed herein will reside data storage hardware such as magnetic disk media, and/or optical data storage media for storing the data entities, it is within the scope of embodiments of the present invention to include such hardware components for enabling such embodiments. Additionally, since the operators (e.g., as described in the flowcharts of FIGS. 5 through 12) are performed on one or more computational devices such as a computer or a network of computers, it is within the scope of embodiments of the present invention to include such computational components for enabling these embodiments. Also, the present invention includes storage media for transporting and/or retaining an encoding of programmatic elements (e.g., software in source code, object code or binary form) for enabling the database entity schema architecture and operators disclosed herein, such storage media being, e.g., magnetic or optical media, as one skilled in the art will understand.

The foregoing description has been presented for purposes of illustration and description. However, the description is not intended to limit the invention as claimed hereinbelow to the form disclosed hereinabove. Consequently, variations and modifications commensurate with the above teachings, within the skill and knowledge of the relevant art, are within the scope of the claims hereinbelow. The embodiments described hereinabove are further intended to explain the best mode presently known of practicing the invention claimed hereinbelow, and to enable others skilled in the art to utilize the claimed invention in various embodiments, and with the various modifications required by their particular application or uses of the invention. Thus, it is intended that the appended claims be construed to include alternative embodiments to the extent permitted by the prior art.

What is claimed is:

1. A method for simulating a group, comprising:
providing a data storage medium having a predetermined group database entity type wherein each instance of the group database entity type includes:
(a-1) an identification storage area for identifying a corresponding group of items, and
(a-2) a group type storage area for identifying the corresponding group as one of:
(i) an actual group of one or more items, and
(ii) a simulated group of one or more items;
wherein the predetermined group database entity type defines a substantially entire data organization for each instance of the group database entity type within a data repository;
providing access to at least a first instance of the predetermined group database entity type using a value in the identification storage area of the first instance, wherein a value for the group type storage area identifies the first instance as corresponding to an actual group ($G_1$) of one or more items;
wherein for evaluating a performance of the first instance, item performance data ($ED_1$) associated with the items of the actual group $G_1$ is accessed according to Type 2 constraints for accessing $ED_1$, wherein the item performance data $ED_1$ is substantially for a time period no earlier than a creation of the actual group $G_1$;
creating a second instance of the predetermined group database entity type on the data storage medium, wherein the second instance corresponds to a simulated group ($G_2$) of one or more items;
wherein the step of creating includes storing a predetermined time value for determining, for the items of $G_2$, an earliest date of creation for item performance data that is desired for simulating an evaluation of $G_2$, wherein the predetermined time value is substantially prior to the creation of $G_2$;
second evaluating a performance of the simulated group $G_2$, wherein item performance data ($ED_2$) associated with the items of the simulated group $G_2$ is accessed for performing the second evaluation;
wherein the accessing of the item performance data $ED_2$ is determined using the predetermined time value;
wherein the predetermined group database entity type provides a common data structure for accessing substantially all data for each of the first and second instances and wherein a supervisor of the actual group $G_1$ is enabled to create the simulated group $G_2$ and wherein the simulated group $G_2$ created by the supervisor comprises an agent not in the actual group $G_1$.

2. The method of claim 1, wherein the item performance data $ED_1$ includes data for identifying a task performed by a first item from the first instance, and the item performance data $ED_2$ includes data for identifying a task performed by a second item from the second instance, and the first and second items are each an agent of a contact center.

3. The method of claim 1, wherein the item performance data $ED_1$, includes first data for identifying a task performed by a first item from the first instance, and the item performance data $ED_2$ includes second data for identifying a task performed by a second item from the second instance, and the first and second data entries are substantially in an identical in data format.

4. The method of claim 1, wherein the predetermined group database entity type defines a data format within a relational database.

5. The method of claim 1, wherein the step of creating includes updating a membership database entity type for identifying the items in group $G_2$ wherein at least one additional entry is added to the membership database entity type, the at least one additional entry including the predetermined time value.

6. The method of claim 5, further including a step of converting the second instance so that $G_2$ is identified as an actual group, wherein the step of converting includes removing an entry from the membership database entity type, wherein the removed entry associates data for an item of $G_2$ with the second instance.

7. The method of claim 5, wherein the instances of the group database entity type and the membership database entity type are provided as tables in a relational database.

8. The method of claim 5, wherein at least one entry in the membership database entity type includes a surrogate key for identifying data for an item of $G_2$, wherein the data is part of the item performance data $ED_2$.

9. The method of claim 1, wherein the step of creating includes updating, via a backsplash process, a membership entity having information identifying the items in groups corresponding to instances of the group database entity type, wherein at least one additional entry is added to the membership entity, the at least one additional entry for providing access to a new data entity corresponding an item of the group $G_2$, wherein the additional entry is for a group different from $G_2$.

10. An apparatus for evaluating groups, comprising:
one or more data repositories for storing instances of a predetermined group database entity type such that each instance of the group database entity type includes:
(a-1) an identification storage area for identifying a corresponding group of items, and
(a-2) a group type storage area for identifying the corresponding group as one of:
  (i) an actual group of one or more items, and
  (ii) a simulated group of one or more items;
at least a first of the instances of the predetermined group database entity type, the first instance identified as an actual group ($G_1$) of one or more items;
at least a second of the instances of the predetermined group database entity type, wherein the second instance corresponds to a simulated group ($G_2$) of one or more items;
one or more evaluators for evaluating a performance of the groups $G_1$ and $G_2$ using, respectively, the first and second instances;
a processor, wherein the processor is operable to perform operations on group database entities;
one or more instances of an agent data entity type, wherein the one or more instances of the agent data entity type provide access to a timestamp field for receiving a time value that identifies a latest creation time for data indicative of a performance of the agent that is associated with the one or more instances of the agent data entity type, and wherein the one or more instances of an agent data entity type comprise the items of group $G_1$ and group $G_2$;
wherein for evaluating the group $G_1$, item performance data ($ED_1$) associated with the items of the actual group $G_1$ is accessed according to Type 2 constraints for accessing $ED_1$, wherein the item performance data $ED_1$ is substantially for a time period no earlier than a creation of the actual group $G_1$;
wherein for evaluating the group $G_2$, a predetermined time value is accessed, wherein the predetermined time value is for determining, for the items of $G_2$, an earliest date of creation for item performance data ($ED_2$) associated with the items of the simulated group $G_2$, wherein the predetermined time value is substantially prior to the creation of $G_2$ and wherein a supervisor of the actual group $G_1$ is enabled to create the simulated group $G_2$ and wherein the simulated group $G_2$ created by the supervisor comprises an agent not in the actual group $G_1$.

11. The apparatus of claim 10, wherein the one or more data repositories include storage for a programmatic element for converting the second instance into an instance corresponding to an actual group.

12. The apparatus of claim 10, wherein the one or more instances of the agent data entity type also provides access to at least one key (K) for identifying the agent.

13. The apparatus of claim 12, wherein the corresponding instance of the predetermined agent data entity type provides access to a timestamp field for receiving a time value identifying an earliest time for data indicative of the performance of the agent that can be accessed via the corresponding instance.

14. The apparatus of claim 12, wherein the K is a surrogate key.

* * * * *

UNITED STATES PATENT AND TRADEMARK OFFICE
CERTIFICATE OF CORRECTION

| | | |
|---|---|---|
| PATENT NO. | : 7,822,587 B1 | Page 1 of 1 |
| APPLICATION NO. | : 11/242687 | |
| DATED | : October 26, 2010 | |
| INVENTOR(S) | : Roger I. Krimstock et al. | |

It is certified that error appears in the above-identified patent and that said Letters Patent is hereby corrected as shown below:

Title page item 57

In the Abstract:

At lines 1-2 of the Abstract, after "therefor" please delete "is disclosed" therein.

At line 13 of the Abstract, after "wherein" please delete "the" therein.

Signed and Sealed this

Twenty-first Day of December, 2010

David J. Kappos
*Director of the United States Patent and Trademark Office*